United States Patent
Liguori

(10) Patent No.: US 10,452,570 B1
(45) Date of Patent: Oct. 22, 2019

(54) PRESENTING PHYSICAL DEVICES TO VIRTUAL COMPUTERS THROUGH BUS CONTROLLERS EMULATED ON PCI EXPRESS ENDPOINTS

(71) Applicant: Amazon Technologies, Inc., Reno, NV (US)

(72) Inventor: Anthony Nicholas Liguori, Bainbridge Island, WA (US)

(73) Assignee: Amazon Technologies, Inc., Reno, NV (US)

(*) Notice: Subject to any disclaimer, the term of this patent is extended or adjusted under 35 U.S.C. 154(b) by 1078 days.

(21) Appl. No.: 14/470,874

(22) Filed: Aug. 27, 2014

(51) Int. Cl.
  *G06F 8/70* (2018.01)
  *G06F 13/10* (2006.01)
  *G06F 9/455* (2018.01)

(52) U.S. Cl.
  CPC ............ *G06F 13/105* (2013.01); *G06F 9/455* (2013.01)

(58) Field of Classification Search
  CPC .................................................. G06F 13/105
  See application file for complete search history.

(56) References Cited

U.S. PATENT DOCUMENTS

| | | | |
|---|---|---|---|
| 7,743,197 B2 | 6/2010 | Chavan et al. | |
| 7,983,888 B2 | 7/2011 | Evoy et al. | |
| 2008/0005297 A1 | 1/2008 | Kjos et al. | |
| 2008/0005446 A1* | 1/2008 | Frantz | G06F 13/107 |
| | | | 710/313 |
| 2009/0006708 A1 | 1/2009 | Lim | |
| 2009/0043921 A1 | 2/2009 | Roy | |
| 2012/0284446 A1 | 11/2012 | Biran et al. | |
| 2013/0138860 A1* | 5/2013 | Moore | G06F 13/362 |
| | | | 710/313 |
| 2014/0281106 A1* | 9/2014 | Saghi | G06F 3/0664 |
| | | | 710/313 |

OTHER PUBLICATIONS

U.S. Appl. No. 14/489,453, filed Sep. 17, 2014, Mark Bradley Davis.
U.S. Appl. No. 14/485,473, filed Sep. 12, 2014, Mark Bradley Davis.
"Usbredir From Spice" accessed Jun. 25, 2014, pp. 1-2.

* cited by examiner

*Primary Examiner* — Timothy A Mudrick
*Assistant Examiner* — Abdou K Seye
(74) *Attorney, Agent, or Firm* — Robert C. Kowert; Meyertons, Hood, Kivlin, Kowert & Goetzel, P.C.

(57) ABSTRACT

A system provides remote computing services using physical or virtualized computing resource instances on various host machines. An enhanced PCIe endpoint card connected to a given host machine may include a local processor (e.g., on an SOC device) that emulates PCIe compliant hardware (e.g., a USB controller) in software. A client receiving computing services from the system may redirect USB traffic from a locally-attached physical USB device (e.g., an input/output, storage, or security device) over the Internet to the enhanced PCIe endpoint card. The enhanced PCIe endpoint card may present an emulated USB controller to an application executing on the host (on the client's behalf) as a device that is locally attached at the given host machine, and the application may access the functionality of the physical USB device by exchanging commands or data with the emulated USB controller through a PCIe controller on the enhanced PCIe endpoint card.

17 Claims, 11 Drawing Sheets

PRESENTING PHYSICAL DEVICES TO VIRTUAL COMPUTERS THROUGH BUS CONTROLLERS EMULATED ON PCI EXPRESS ENDPOINTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Some service providers host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some cases, the virtualized resources instances are configured to implement virtual desktop instances. Today, a common way to implement virtualization for peripheral devices is to run a process in a virtual machine (or hypervisor) on the main server cores of the system on which other virtual machines are running on behalf of guests. The process traps all of the accesses to the virtual hardware for the peripheral devices and then emulates those devices in software.

Figure 1:
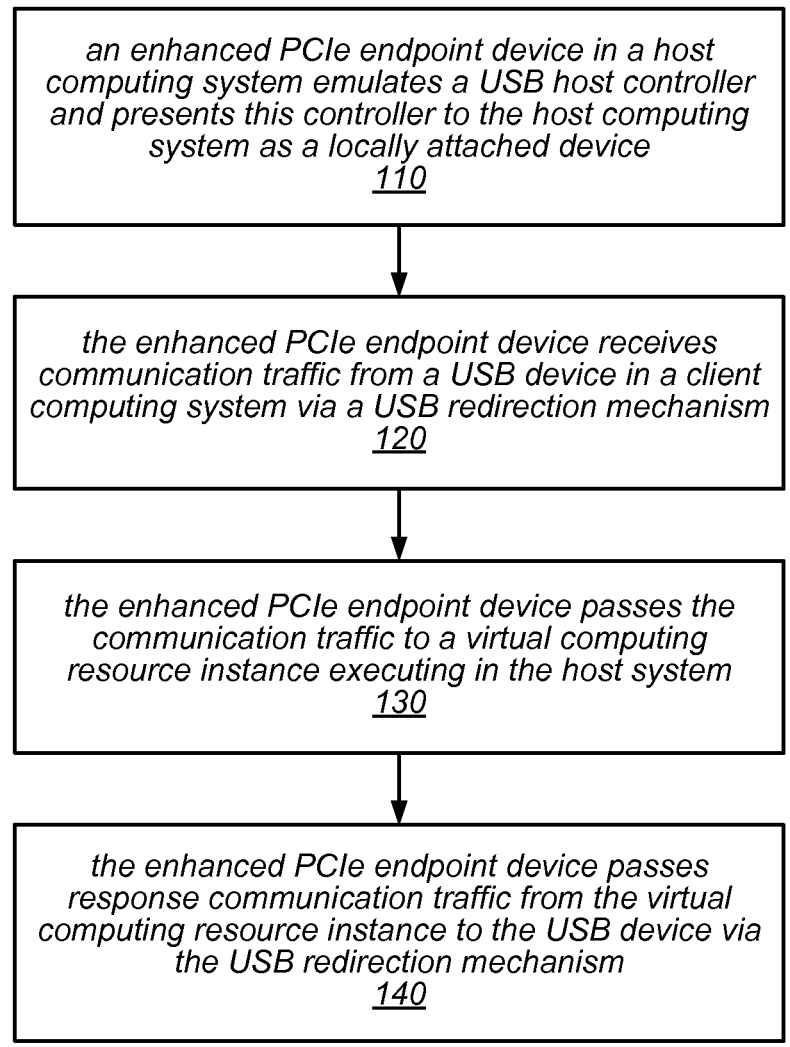
FIG. 1 is a flow diagram illustrating one embodiment of a method for presenting a physical device to a virtual computer through the emulation of a USB controller on an enhanced PCI endpoint device.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Many peripheral devices are compliant to the PCI Express (Peripheral Component Interconnect Express) bus standard.

PCI Express (also referred to as PCIe) is a high-speed serial computer expansion bus standard, some versions of which support hardware I/O virtualization. In general, a PCIe bus supports full-duplex communication between any two endpoints, with data encapsulated in packets. A system that provides computing resources (e.g., remote computing services) may include enhanced PCIe endpoint devices on which one or more local processors emulate PCIe compliant hardware in software. In some embodiments, such an enhanced PCIe endpoint device may emulate a peripheral bus interface and/or protocol, and may be configured to route traffic that is received from a physical peripheral device over a network (e.g., using bus direction) to physical and/or virtualized computing resources in the system (e.g., resources that have been provisioned for the use of a client, customer, or service subscriber). In some embodiments, the hardware architecture of the enhanced PCIe endpoint devices and the techniques described herein may allow multi-threaded software to emulate any type of single root I/O virtualization (SR-IOV) PCIe device, with hardware acceleration, and compliant with PCIe ordering rules.

In some embodiments, the enhanced PCIe endpoint devices described herein may include host interface circuitry that implements pointer registers and control and status registers for each of multiple transaction ring buffers instantiated in memory on the device. In response to receiving a transaction layer packet that includes a transaction, packet steering circuitry on the endpoint device may push the transaction into a particular one of the buffers, dependent on the transaction type, a routing identifier for an emulated hardware device to which it is directed, and/or its traffic class. Subsequently, the transaction may be processed in software (e.g., software executing on a local processor on the enhanced PCIe endpoint device), which emulates the targeted hardware device. In some embodiments, the host interface circuitry may generate response completion packets for configuration requests and non-posted transactions, and may return them according to PCIe ordering rules, regardless of the order in which they were processed on the endpoint device.

In some embodiments, the systems described herein (e.g., systems that provide virtualized computing and/or storage resources to clients) may use a processor that is not part of the main CPU complex (e.g., the CPU complex that executes virtual machines on behalf of guests) to perform the emulation of PCIe compliant hardware devices (or physical and/or virtual functions thereof). For example, an enhanced PCIe endpoint device may be a PCIe card on which is built an interface that facilitates the emulation of hardware devices using what is essentially a PCI pass-through to connect virtual machine guests directly over the PCI bus to the PCIe card, on which the emulation software is running.

The PCIe device emulation approach described herein may allow a wide-range of device controllers to be emulated in software on the device. This approach may allow service providers to create virtual devices (aka self-virtualizing devices), i.e., full virtual device controllers in software, which may eliminate any requirement for instantiating every potentially interesting device controller in the PCIe endpoint device. In some embodiments, the enhanced PCIe endpoint devices described herein may provide a hardware architecture that enables a high-performance, flexible platform for SR-IOV device emulations.

In some embodiments, the enhanced PCIe endpoint devices described herein may implement the following functions and features:

Provide an enhanced PCIe endpoint that presents multiple PCIe physical functions (PFs), and a large number of virtual functions (VFs) per PF.

Present a SR-IOV target interface to the compute host that allows for optimized software implementation of fungible devices. The enhanced PCIe endpoint devices described herein may support at least 4096 virtual functions (VFs) that are presented as fungible devices. In various embodiments, these devices may support efficient implementation of any or all of the following personality types, as well as others not listed below:
NVMe
Virtio-net-pci
VGA
Super I/O, including all of the legacy platform devices such as four UARTs, the PCKBD controller, the RTC, a firmware configuration interface, the Programmable Interval Timer (PIT), and an I/O APIC.
USB xHCI Controller
Management function
Provide hardware response for configuration requests.
Provide ability for software to intercept both posted and non-posted transactions to allow for device emulation.
Provide ability for multiple threads to participate in device emulation, allowing software to complete transactions in-order or out-of-order, and a hardware mechanism to enforce PCIe ordering rules for completion responses.
Facilitate hypervisor/kernel bypass to allow host's guests to directly interact with the emulated devices.

In some embodiments, the ability of the enhanced PCIe endpoint devices described herein to emulate physical hardware devices and/or bus/interface controllers may be exploited in order to provide a mechanism for presenting physical devices (e.g., peripheral devices that are physically attached to a client device) to physical or virtual computers in a host system as if they were locally attached to the computers in the host system. For example, in an embodiment in which an enhanced PCIe endpoint device is configured to emulate a USB host controller, a USB redirection mechanism implemented in a client system may be used to communicate traffic from a physical USB device in the client system to a virtual compute instance executing in the host system that includes the enhanced PCIe endpoint device. As described in more detail herein, the client's physical USB device may, through the use of USB redirection at the client and emulation of a USB controller on the enhanced PCIe endpoint at the host, appear as if it were locally attached to the virtual compute instance. Such a mechanism may be particularly useful in systems in which a service provider implements a virtual desktop infrastructure comprising virtual desktop instances and/or offers virtual desktop services to its customers or service subscribers.

In some cases, users (e.g., customers or service subscribers) who interact with a virtual desktop on a host server from a client system would like to be able to access the functionality of various physical devices (e.g., peripheral devices) of the client system. For example, they may wish to control a music player or printer from the virtual desktop, or to use a local physical security device (e.g., a physical security token) to authenticate their desktop instance or gain access to secure applications executing on the virtual desktop, in different scenarios. In various embodiments, the apparatus and techniques described herein may provide a mechanism to facilitate such access through a bus redirection mechanism or by otherwise remoting a local device that is attached to a thin client or to the client's local machine over the internet to an enhanced PCIe endpoint card, and then presenting the local device through this enhanced PCIe endpoint card to the physical system that implements the host server on which the virtual desktop instance is executing as if it were locally attached to the host server.

Note that the remoting of a locally-attached USB device has been implemented in some existing systems purely in software (e.g., in a virtualization layer on the host platform). However, the apparatus and techniques described herein may not necessarily rely on this type of virtualization software in order to present physical client devices to physical or virtual compute instances that have been provisioned on a host server for the use of a client as if they were locally attached. Instead, they may exploit the use of physical devices in the host system (e.g., enhanced PCIe endpoint devices) to perform the emulation of a PCIe device (e.g., a USB controller) in order to present the USB device through the PCIe device and, ultimately, to expose its functionality to a physical or virtual compute resource on the host server.

In other words, in some embodiments there may be no need for USB communication traffic from a physical client USB device to go through a remote USB virtualization software stack on the host system because an enhanced PCIe endpoint device may present a physical USB controller on the host system for the physical or virtual instance on the host system. In one example, on a client network, a computer may include a locally-attached physical USB device that originates USB communication traffic (e.g., USB network data that includes commands and/or data), and USB redirection may be used to send that traffic over an intermediate network (e.g., the public Internet or another network) to a host system (e.g., to a host system of a cloud-based service provider) on which a virtual desktop instance is executing one or more applications on behalf of the client. When that remote USB communication traffic is received by the host system in the cloud, the commands and/or data within the USB communication traffic may be routed to the enhanced PCIe endpoint device, which then may make it appear as if the physical USB device that is locally attached to the client computer is a physical USB device that is locally attached to that virtual desktop instance in the cloud.

One embodiment of a method for presenting a physical USB device to a virtual computer through the emulation of a USB controllers on an enhanced PCI endpoint device is illustrated by the flow diagram in FIG. 1. In this example, the method is presented from the perspective of the enhanced PCI endpoint device and the USB communication traffic received by the enhanced PCI endpoint device is initiated at a client's USB device. As illustrated at 110 in FIG. 1, the method may include an enhanced PCIe endpoint device (e.g., a physical PCIe card) in a host computing system emulating a USB host controller and presenting this controller to the host computing system as a locally-attached device. The method may also include the enhanced PCIe endpoint device receiving communication traffic from a USB device (e.g., a physical peripheral device) in a client computing system via a USB redirection mechanism (as in 120), e.g., over the Internet or another intermediate network.

As illustrated in FIG. 1, the method may include the enhanced PCIe endpoint device passing the USB communication traffic to a virtual computing resource instance executing in the host system, as in 130. The method may also include the enhanced PCIe endpoint device passing response communication traffic from the virtual computing resource instance to the USB device via the USB redirection mechanism (as in 140), again, over the public Internet or another intermediate network.

Note that in this and other examples described herein in which a physical peripheral device is presented to a virtual computing resource instance as a locally-attached device using a physical PCIe device (an enhanced PCIe endpoint device) to emulate the appropriate bus controller, the presentation of the peripheral device does not rely on any features of the hypervisor or virtual machine that is executing on the host system. Therefore, the techniques described herein may be employed in a variety of different systems in which any suitable hypervisor or virtual machine technology is employed in providing virtualized computing resources to clients, including those that do not provide support for the type of bus redirection mechanisms (e.g., USB redirection) described in the included examples. In fact, in some embodiments, the techniques described herein for presenting physical devices to virtual computers through the emulation of bus controllers on PCIe endpoint devices may be applied when running on bare metal (e.g., to present physical client devices to provisioned physical computing resources on the host system). In such embodiments, the existence of a hypervisor or virtual machine on the host system may be optional.

Most existing PCIe endpoint cards on the market implement the actual PCIe controllers as hardware controllers on the card. The enhanced PCIe endpoint cards described herein may instead include a hardware infrastructure that enables high-speed emulation of devices, while the actual controllers are implemented as software emulations (as opposed to being implemented in dedicated hardware on the card). In other words, this approach may provide a hardware interface that facilitates the accelerated emulation of arbitrary PCI devices in order to reap the benefits of off-loading emulation onto a separate hardware card (thus freeing up main CPU capacity), while also providing the flexibility that comes along with software virtualization).

As described in more detail below, an enhanced PCIe endpoint may include a host interface module that is implemented largely (or entirely) in a hardware module (e.g., in host interface circuitry). In some embodiments, the host interface module may include multiple transaction ring buffers (e.g., circular queues) into which transactions directed to the endpoint (or to emulated hardware devices or physical and/or virtual functions thereof) are placed upon receipt and from which the transactions may be retrieved for processing on the endpoint (e.g., by a general purpose processor that executes emulation code for various hardware devices).

Figure 2:
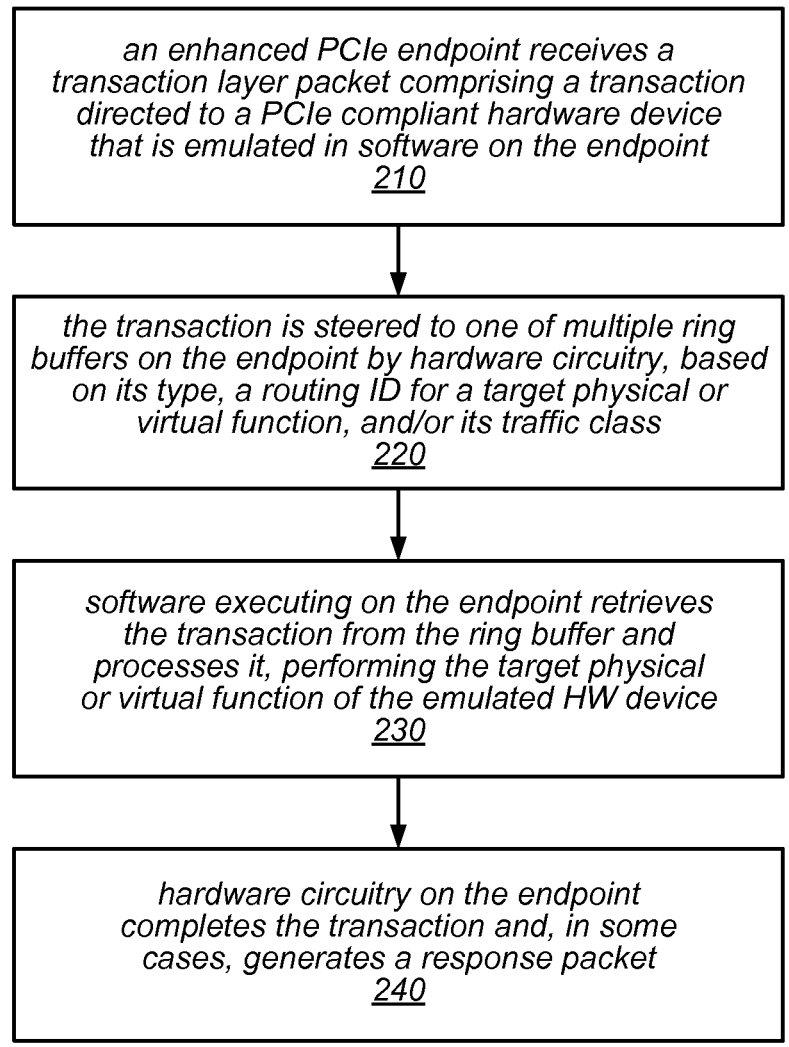
FIG. 2 is a flow diagram illustrating one embodiment of a method for using an enhanced PCIe endpoint device to emulate a PCIe compliant hardware device.

One embodiment of a method for using an enhanced PCIe endpoint device to emulate a PCIe compliant hardware device is illustrated by the flow diagram in FIG. 2. As illustrated at 210, in this example, the method may include an enhanced PCIe endpoint (e.g., a host interface module or host interface circuitry of the endpoint) receiving a transaction layer packet comprising a transaction directed to a PCIe compliant hardware device that is emulated in software on the endpoint. Note that in some embodiments, the emulated hardware device may be one of multiple hardware devices emulated in software on the endpoint. As illustrated in this example, the method may include steering the transaction to one of multiple ring buffers on the endpoint (e.g., circular buffers that are instantiated in memory on the endpoint) by hardware circuitry, based on the transaction type, a routing ID for a target physical or virtual function, and/or the traffic class for the transaction, as in 220.

As illustrated in FIG. 2, the method may include software executing on the endpoint retrieving the transaction from the ring buffer and processing it, which may include performing the target physical or virtual function of the emulated hardware device, as in 230. The method may also include hardware circuitry on the endpoint completing the transaction and, in some cases, generating a completion response packet, as in 240.

Figure 3:
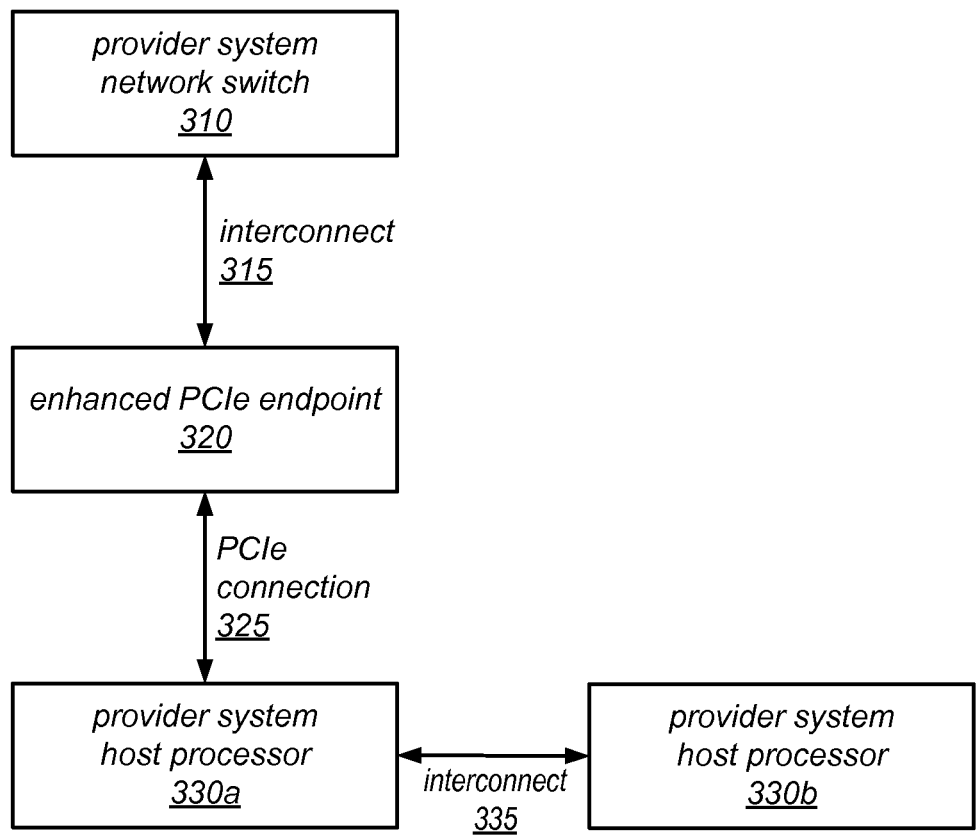
FIG. 3 is a block diagram illustrating the relationships between an enhanced PCIe endpoint in a service provider system, the host processors of the service provider system, and a service provider network switch, according to at least one embodiment.

FIG. 3 is a block diagram illustrating the relationships between an enhanced PCIe endpoint in a service provider system, the host processors of the service provider system, and a service provider network switch, according to one embodiment. In this example, a provider system network switch 310 is coupled to an enhanced PCIe endpoint 320 (e.g., a PCIe card in a data center of a service provider that provides computing and storage services) over an interconnect 315 (e.g., an Ethernet connection). The enhanced PCIe endpoint 320 is coupled to provider system host processor 330a (e.g., one of multiple main server processors or motherboard processors in the service provider system) over a PCIe connection 325. In this example, provider system host processor 330a is coupled to provider system host processor 330b over interconnect 335 (e.g., a point-to-point processor interconnect) and may route communication traffic to provider system host processor 330b. In other embodiments, the enhanced PCIe endpoint 320 may have the ability to support PCIe interfaces to both provider system host processors to minimize latency and jitter effects of relaying the traffic directed to provider system host processor 330b through provider system host processor 330a. In some embodiments, the provider system network switch 310 may serve to connect the enhanced PCIe endpoint 320 (or a network interface thereof) to other networks (e.g., to the public Internet or to an intermediate network) and/or to other networked devices in the provider's data center (e.g., to the next level data center routers that, eventually, connect together all of the other servers, or racks thereof, in the data center). For example, in some embodiments, communication traffic that is received over a network from a peripheral device (e.g., a USB device) in a client system using a bus redirection mechanism (e.g., USB redirection) may be received through provider system network switch 310.

In some embodiments, the PCIe connection 325 between enhanced PCIe endpoint 320 and provider system host processor 330a may be a third generation PCIe interface (e.g., a PCIe Gen3 x4, x8, or 16 interface, depending upon bandwidth, cost, and/or power considerations) and the PCIe controller for enhanced PCIe endpoint 320 may be a dual-mode (root complex and endpoint) controller. In some embodiments, enhanced PCIe endpoint 320 (and/or its host interface) may be configured to be software extensible such that a wide range of different devices and physical functions thereof may be realized in software.

In existing single root I/O virtualization (SR-IOV) PCIe devices, there is typically a dedicated hardware controller (e.g., one implemented in an integrated circuit device) for each different physical function, and the SR-IOV allows multiple guests to share the controller for a physical function (which is fixed in hardware). By contrast, the enhanced PCIe endpoint cards described herein may include an embedded processor core on the PCI card that emulates those different physical function controllers in software running on that processor core.

PCIe Conceptual Model

In some embodiments, the functional organization of the enhanced PCIe endpoint cards described herein may be similar to that of other SR-IOV PCIe devices. For example, they may implement multiple different physical functions, and with each physical function there may be multiple different virtual functions (e.g., there may be three virtual functions for a given physical function).

In some embodiments, an enhanced PCIe endpoint card, such as those described herein, may be implemented according to the following conceptual model:

The endpoint may present itself as an SR-IOV Multi-PF capable endpoint.

The endpoint may perform address translation (ATC/ATS) the between PCIe addresses and local memory addresses of the endpoint.

Each emulated device may present itself as a single physical function, and as a software-defined number of virtual functions In general, a DMA engine may be instantiated for each device class for which emulation is supported in order to increase isolation between emulated device classes The endpoint may instantiate twice the number of DMA engines than the number of device families that are expected, in order to optimize for incoming/outgoing transactions In some embodiments, the enhanced PCIe endpoint cards described herein may support the PCI SR-IOV functions but the actual function of the piece of silicon may vary. For example, one day it might be programmed to implement a VGA adapter, on another day it may be reprogrammed to implement a USB device, and on yet another day, it may be reprogrammed for Ethernet. In some embodiments, a wide range of such devices may all be emulated at once on a single card. In some such embodiments, it may appear as if the card includes a large number of different types of controllers that are built into the card at the same time. Note that in some embodiments, there may be a fixed maximum number of physical functions that can be emulated on the enhanced PCIe endpoint card at the same time (e.g., 256). Each of the functions (e.g., a USB function, a VGA function, an Ethernet function, etc.) may be called by software, and an SR-IOV may operate on top of each of those functions. In some embodiments, a PCI switch or PCI bridge that is implemented within this card (e.g., one implemented either in hardware or software) may be used to expand the number of available functions beyond 256. Note that, in this example, each of the SR-IOV virtual functions may still need to be the same type as a particular physical function. Note also that the same hierarchy for the virtual functions of a particular physical function defined for all SR-IOV devices may be implemented in the enhanced PCIe endpoint cards described herein.

SR-IOV Support

In embodiments of the enhanced PCIe endpoints that provide SR-IOV support, the following functions and features may be supported:

Each virtual function may share a number of common configuration space fields with the physical function; i.e., where the fields are applicable to all virtual functions and controlled through a single physical function.

Each function, physical function, and virtual function may be assigned a unique Routing ID. The Routing ID (RID) for each virtual function may be determined using the Routing ID of its associated physical function and fields in that physical function's SR-IOV Capability.

Each physical function may be assigned zero or more virtual functions. The number of virtual functions per physical function is not required to be identical for all physical functions within the device.

Each physical function may represent a different device type.

Using the Alternative Routing Identifier (ARI) capability, a device may support up to 256 physical functions, and may be sparse throughout the 256 Function Number space.

SR-IOV Devices may consume more than one Bus Number. A virtual function may be associated with any Bus Number within the device's Bus Number range, which includes the captured Bus Number plus any additional Bus Numbers that are configured by software.

The use of multiple Bus Numbers may enable a device to support a very large number of virtual functions, e.g., up to the size of the Routing ID space minus the bits used to identify intervening busses.

PCIe Transaction Processing

An enhanced PCIe endpoint card may present itself as a native PCIe endpoint that is presenting a configuration header type 0. The enhanced PCIe endpoint card may receive and process transactions of different types, as described below.

PCIe Request Types

Host interface transaction processing of incoming transactions received by the enhanced PCIe endpoint card may be divided into three categories:

Configuration requests, non-posted read/write (type 0 and type 1)
Non-posted request types
Memory read, memory read lock, IO read, IO write
Posted request types
Memory write, message In some embodiments, for non-posted requests, a requestor may send a packet to the enhanced PCIe endpoint card for which a completer should generate a response in the form of a completion response packet. Note that even I/O and configuration writes may be non-posted, e.g., in orcer to confirm that the write data has in fact made it to the destination without error. For posted requests, the targeted devices may not return a completion transaction layer packet (TLP) to the requestor. In some embodiments, configuration commands (e.g., configuration cycles) may be processed completely in hardware, with no software intervention. Other types of transactions (or commands/cycles) may be pushed into transaction ring buffers that are being managed in hardware and from which they may be retrieved (e.g., pulled out of a circular queue) for processing.

Quality of Service (QoS)/Traffic Class (TC) Support

PCIe supports QoS policies and agreements by setting a 3-bit field within each packet called the Traffic Class (TC). A higher numbered TC is expected to give a higher priority to the packet. In some embodiments, multiple buffers, aka virtual channels (VCs) may be allocated for each TC so that packets can flow through each VC without being backed up behind packets with TCs that indicate a lower priority.

Transaction Ordering

Within a VC, packets may normally flow through the VC in the same order in which they arrived, with some exceptions. However, it may be understood by software that there is no ordering relationship between different TCs. The PCIe specification describes a transaction ordering model that must be maintained (e.g., defining when reads pass reads, writes pass reads, writes pass writes, etc., for different types of transactions). In embodiments in which an enhanced PCIe endpoint supports multithreaded emulation, the enhanced PCIe endpoint may include a hardware mechanism to maintain the transaction ordering semantics, so that regardless of the order in which multiple threads of the emulation process transactions, PCIe compliant transaction ordering semantics are maintained.

In one example, different tiers of multiple cores or multiple threads may all pull transactions off the same queue (e.g., off of the same transaction ring buffer). The queue may include transactions specifying various read, write, and configuration commands, and the different cores (or threads thereof) may all perform work on those transactions simultaneously. In some embodiments, any completion response packets generated for transactions that are processed simultaneously or out of order may be manipulated by the host interface circuitry to enforce compliance with the ordering rules. Note that in some embodiments, the transaction ordering requirements may be enforced separately within the context of each physical function (e.g., the ordering may be independent from one physical function to the next). As described herein, the enhanced PCIe endpoint may include a set of transaction ring buffers (queues) for the different types of transactions, and may include separate transaction ring buffers for the different virtual channel/traffic classes for each of those transaction types. In some embodiments, circuitry within the enhanced PCIe endpoint may be configured to keep up with the order in which incoming transactions are received. For example, the circuitry may include one or more timers that timestamp the transactions when they are received so that the order in which they are received is known. Subsequently, some additional hardware circuitry (e.g., logic circuitry) may be configured to implement the PCIe ordering rules in order to enforce them. The implementation of the PCIe transaction ordering rules in the enhanced PCIe endpoint may contribute to enhanced performance because they may allow transactions to go around other transactions that were received earlier but that are stalled. In addition, the implementation of the PCIe transaction ordering rules in the enhanced PCIe endpoint may allow the system to avoid deadlocks.

As described herein, any arbitrary number of hardware-managed ring buffers may be instantiated in memory on an enhanced PCIe endpoint, and a hardware steering mechanism may include a software-definable mapping of the tuples of routing ID and transaction class to specific transaction ring buffers. For example, in some embodiments, software may be configured to create a mapping table to map each tuple of routing ID and transaction class to a specific transaction ring buffer. In such embodiments, for each incoming transaction layer packet, the hardware steering mechanism may steer the transaction to a specific ring buffer, which may then add the transaction into its circular queue.

Figure 4:
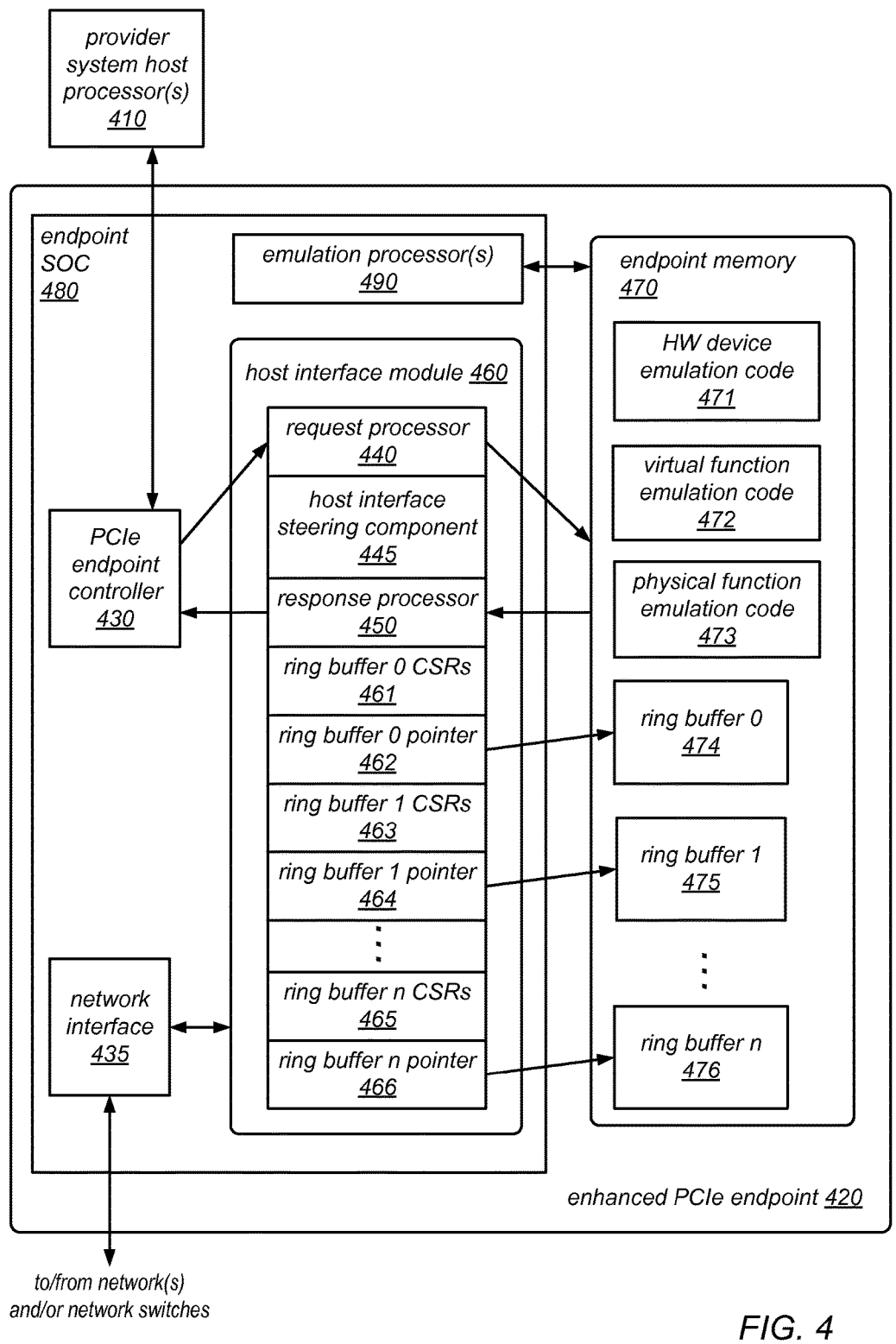
FIG. 4 is a block diagram illustrating an enhanced PCIe endpoint device, according to at least one embodiment.

One embodiment of an enhanced PCIe endpoint (e.g., a PCIe endpoint device on which the hardware is configured to support accelerated multi-device emulation and/or the presentation of physical peripheral devices to provisioned physical or virtual computers, or virtual compute instances thereof) is illustrated by the block diagram in FIG. 4. In this example, enhanced PCIe endpoint 420 communicates with one or more provider system host processors 410 over a PCIe compliant interface. Enhanced PCIe endpoint 420 includes a PCIe endpoint controller 430, and a host interface module 460, which is implemented as a hardware module (e.g., host interface circuitry), and which includes a request processor 440, a host interface steering component 445, and a response processor 450. In this example, transaction layer packets (TLPs) are exchanged between PCIe endpoint controller 430 and request processor 440, and between PCIe endpoint controller 430 and response processor 450. Enhanced PCIe endpoint 420 also includes a network interface 435, through which enhanced PCIe endpoint 420 and its components (e.g., the components that make up endpoint SOC 480) communicate with other networks (e.g., the public Internet or an intermediate network) and/or with other networked devices in a provider's data center (e.g., through various network switches). For example, in some embodiments, communication traffic that is received over a network from a peripheral device (e.g., a USB device) in a client system using a bus redirection mechanism (e.g., USB redirection) may be received from a provider system network switch (such as provider system network switch 310 in FIG. 3) through network interface 435.

In the example illustrated in FIG. 4, host interface module 460 also includes, for each of multiple transaction ring buffers, a control and status register (CSR) and a pointer register. These are illustrated in FIG. 4 as ring buffer CSRs 461, 463, and 465, and as ring buffer pointers 462, 464, and 466. In this example, enhanced PCIe endpoint 420 also includes emulation processor(s) 490 (e.g., one or more single core or multi-core processors, some of which may be configured to execute multithreaded applications). As illustrated in this example, in some embodiments, PCIe endpoint controller 430, host interface module 460, emulation processor(s) 490, and network interface 435 may be implemented as components of a single system-on-chip (SOC) device (shown as endpoint SOC 480) on enhanced PCIe endpoint 420.

In this example, enhanced PCIe endpoint 420 includes endpoint memory 470 (which may, in some embodiments, be implemented as DRAM). In this example, enhanced PCIe endpoint 420 has instantiated within memory 470 multiple transaction ring buffers. For example, ring buffers 0-n are shown as elements 474-476 in FIG. 4. In other embodiments, these transaction ring buffers may be instantiated in memory on endpoint SOC 480 (e.g., in SRAM) rather than in endpoint memory 470. In this example, endpoint memory 470 is also configured to store emulation code for one or more PCIe compliant hardware devices (and/or for the physical and/or virtual functions thereof). This is illustrated in FIG. 4 as HW device emulation code 471, virtual function emulation code 472, and physical function emulation code 473. In some embodiments, enhanced PCIe endpoint 420 may include a physical or virtual PCI switch (not shown), which may allow the endpoint to provide a large number of emulated devices and functions within multiple sets of such emulated devices and functions.

Host Interface Transaction Ring Buffer Processing

In some embodiments, the use of the transaction ring buffers and the hardware packet steering mechanism described herein may allow enhanced PCIe endpoints to handle all the different physical functions and virtual functions that are targeted by incoming transactions and to divide and queue the transactions up in different ones of the transaction ring buffers in different ways dependent, at least in part, on the transaction types and/or the traffic classes of the transactions.

As previously noted, the host interface module of the enhanced PCIe endpoints described herein may have the ability to define a number of transaction ring buffers. The host interface module may include the following function and features, in some embodiments:

A steering mechanism may be provided that allows for software to define a mapping from the tuple of [RID, TC] to a specific transaction ring buffer.

Ring buffers may be managed with head and tail pointers.

Each entry of the ring buffer may contain core TLP data, which may include transaction information and transaction processing information, as follows:

Transaction information:
        Header information:
            Transaction type
            Target address
            Routing ID (RID)
            Transfer size (if any), byte enables
            Attributes
            Traffic class
        Data
    Transaction processing information:
        Timestamp data
        Transaction valid bit
        Transaction completion doorbell In some embodiments of the enhanced PCIe endpoint cards described herein, both read transactions and write transactions may be pushed into the same transaction ring buffer so that software sees the global ordering of the received transactions (per TC). As described in more detail herein, the enhanced PCIe endpoint cards may implement or support two transaction completion mechanisms, as follows:

A software synchronous model in which software is notified of a transaction, performs any desired processing, and writes a transaction doorbell indicating completion of the transaction.

A notification model for posted and configuration transactions in which software simply gets notified of the transaction.

In various embodiments, the enhanced PCIe endpoint cards described herein may include, for each ring buffer:

control and status registers (CSRs) for head, tail pointers a CSR bit indicating whether an interrupt should be issued when a transaction is posted. The interrupt may be generated via an interrupt controller (to allow programmable steering to set of CPUs).

a CSR bit indicating whether Configuration Read transactions should be pushed into this ring buffer.

a CSR bit indicating whether Configuration Write transactions should be pushed into this ring buffer.

a CSR bit indicating whether posted transactions should be pushed into this ring buffer as a Notification.

a CSR bit indicating whether posted transactions should be pushed into this ring buffer as a Software Synchronous Transaction.

In some embodiments, although much of the functionality of the endpoint is implemented in hardware, the enhanced PCIe endpoint cards described herein may be configured using software (e.g., by one or more configuration modules executing on the endpoint). For example, in some embodiments, emulation code (such as HW device emulation code 471, virtual function emulation code 472, and/or physical function emulation code 473 illustrated in FIG. 4) may be written into the memory on an enhanced PCIe endpoint card (such as endpoint memory 470 on enhanced PCIe endpoint 420 in FIG. 4) by software executing on the endpoint itself or on a host server to which it is connected in order to initialize the enhanced PCIe endpoint for subsequent emulation of various hardware devices and virtual or physical functions thereof, e.g., by the execution of this code by a processor on the enhanced PCIe endpoint (such as emulation processor 490 within endpoint SOC 480 illustrated in FIG. 4). Note that, in some embodiments, after initially writing emulation code into the endpoint memory, the endpoint may be subsequently reconfigured to support the emulation of more, fewer, or different functions by writing additional code into the endpoint memory, deleting code from the endpoint memory, or overwriting the code in the endpoint memory.

In another example, software may be used to initialize (and/or subsequently reconfigure) the functionality of the hardware on the enhanced PCIe endpoint. For example, software executing on the endpoint itself or on a host server to which it is connected may be configured to instantiate multiple transaction ring buffers in memory on the endpoint (e.g., in memory within the endpoint SOC or in a separate endpoint memory), and may also be configured to write initial values into the pointer registers and the control and status registers for those ring buffers in order to configure and manage them.

As noted above, in some embodiments of the enhanced PCIe endpoint cards described herein, both read transactions and write transactions may be pushed into the same transaction ring buffer so that software sees the global ordering of the received transactions. As noted above, the transaction ring buffers may be implemented in hardware. For example, they may be instantiated in physical memory on the enhanced PCIe endpoint card, such as in a DRAM that serves as the operating memory for a local processor core on the endpoint card (such as emulation processor 490 in FIG. 4). Note that the number of transaction ring buffers that are (or that can be) instantiated on an enhanced PCIe endpoint card may be somewhat arbitrary, as there may not be a fixed relationship between transaction ring buffers and physical functions or virtual functions, and there may not be any fixed constraints on the number of transaction ring buffers.

In addition to serving as buffers for all the transactions that are received, the transaction ring buffers may also serve as a mechanism for maintaining the read/write ordering of the incoming transactions. As described herein, a hardware packet steering mechanism may have the ability to separate out incoming transactions by their traffic classes so that the lower priority transactions cannot block higher priority transactions. In some embodiments, there may be multiple different ring buffers for storing transactions in (respective) different traffic classes, and they may be separated out and steered to the different ring buffers according to a software-definable mapping. In other words, when the software is designed, the programmer may determine the mapping that is needed between the routing IDs/traffic classes and the transaction ring buffers, and may determine the number of different transaction ring buffers to instantiate in the memory on the enhanced PCIe endpoint card, depending on the type of device(s) being emulated or other factors. In one example, the number of transaction ring buffers may be equal to the number of processor cores on the endpoint card (e.g., the number of cores in the local emulation processor on the endpoint card), such as 4, 8, or 16. As previously noted, each transaction ring buffer has its own control and status register (CSR), in some embodiments.

Configuration Transaction Processing

In some embodiments, only the root complex (e.g., a host server processor) may be permitted to originate configuration requests, and these requests may only move downstream. These requests may be routed based on the target device's ID (e.g., its BDF, which comprises: its Bus number in the topology, its Device number on the bus, and the Function number within the device).

In some embodiments, the enhanced PCIe endpoint card may presents itself as a type 0 extended configuration space. This configuration space may include 4096 bytes per function. In some embodiments, the host interface of the enhanced PCIe endpoint card may provide the following transaction processing functions and features for configuration transactions:

The endpoint card may provide a mechanism to map a 4K "proxy" configuration workspace per BDF.

For non-posted configuration read transactions:
  The endpoint card may build and return a completion packet by reading the data from the corresponding proxy configuration workspace. Software may have pre-populated this proxy configuration workspace with the desired data.
  Optionally (as determined by a CSR bit), the endpoint card may push a Configuration Read notification record to the corresponding host interface processing ring buffer.

For non-posted configuration write transactions:
  The endpoint card may write the configuration data to the corresponding proxy configuration workspace.
  The endpoint card may build and return a completion packet indicating the successful configuration write.
  Optionally (as determined by CSR bit), the endpoint card may push a Configuration Write notification record to the corresponding host interface processing ring buffer.

Host Software Synchronous Transactions

In some embodiments, the enhanced PCIe endpoint cards described herein may support software synchronous transactions, which require completion responses. In such embodiments, any incoming transaction that has been pushed into a transaction ring buffer as a software synchronous transaction may need to be marked as completed by software writing to the corresponding event doorbell for that transaction. Generally, software may either poll or be notified that there is a transaction to process. Software may then perform any emulation processing required to process the transaction, and may use one of two techniques to complete the transaction, after which point the completion response packets (return messages) may be generated by hardware on the enhanced PCIe endpoint card. The two completion techniques may be described as follows:

1. The software may write the address of the completion response packet into that transaction entry doorbell. In one example, there are multiple cores (or even a single core) processing multiple transactions retrieved off of a single queue, and three transactions (commands) have come into the transaction ring buffer that they are working on. If two of the three (e.g., the bottom two) have been processed (e.g., emulated), one way to indicate that the transactions are ready to be completed may be to update the tail pointer for the transaction ring buffer by two to tell the hardware that it can now complete two of the three transactions.

2. The software may update the ring buffer tail pointer to indicate that the oldest transaction is to be completed. In embodiments that apply this approach, doorbells may be marked individually in each transaction (command), such that the transactions may be processed out of order (from a software perspective). The hardware may be configured to detect that the transactions were processed out of order (e.g., based on timestamps and or other information) and to manipulate the return of the completion response packets for those transactions to enforce PCIe transaction ordering rules. The hardware may also be configured to update the tail pointer for the transaction ring buffer.

In some embodiments, the host interface hardware module (e.g., host interface circuitry) of an enhanced PCIe endpoint card may be configured to complete transactions as follows:

If the doorbell is written for the transaction at the tail pointer or if the tail pointer is updated by software, the completion response for that transaction may be sent to the host and the tail pointer may be updated.

If the doorbell is written for a transaction that is not at the tail pointer, hardware may enforce the PCIe ordering rules to determine when to send the completion response for that transaction, and may mark that transaction with a Software Completed/Pending Completion Message.

In some embodiments, having support for two different ways of handling synchronous transactions may provide more flexibility for the software to perform transactions out of order. For example, multiple transactions may be completed just by manipulating the tail pointer to indicate the number of transactions that have been completed in software, or the transactions may be marked as complete individually, even if they are not pointed to by the tail pointer. In some embodiments, the hardware may maintain an association with the tail pointer, as well as the order of the completion responses to be sent back to the requester to maintain PCIe ordering. The selection of the technique that software uses in completing transactions may be up to the programmer who writes an application or an emulator driver, and one approach may potentially be better for one driver and the other way may be better for other drivers.

The techniques described herein for using an enhanced PCIe endpoint to emulate PCIe compliant hardware devices may provide an accelerated and more flexible emulation approach when compared to existing virtualization approaches. In some embodiments, the hardware architecture described herein may enable a high-performance, flexible platform for SR-IOV device emulations, allowing PCIe compliant devices to be emulated in system software. For example, these techniques may be used to provide the following features and functionality:

- Multi-threaded out of order synchronous software completion, while maintaining PCIe transaction ordering rules
- Hardware completion of configuration reads/writes for software emulation
- Data structures/processing for hardware facilitation of software emulation
- Methods for supporting emulation for multiple devices, physical functions, and virtual functions, as well as multiple traffic classes
- Support for both a software notification model and a software emulation model As previously noted, in some embodiments, the enhanced PCIe endpoints described herein may be configurable (e.g., programmable) and reconfigurable (e.g., reprogrammable) using software (e.g., one or mode configuration modules that run on the enhanced PCIe endpoint or on a host server to which it is connected). In some such embodiments, after receiving and processing requests directed to the PCIe compliant hardware devices that the endpoint is initially configured to emulate, if a request to change the functionality of the endpoint is received, this software may reconfigure the enhanced PCIe endpoint card to emulate more, fewer, or different PCIe compliant hardware devices and physical/virtual functions thereof, after which the enhanced PCIe endpoint card may receive multiple transaction layer packets directed to hardware devices and physical/virtual functions that are emulated on the reconfigured endpoint and may process them, as appropriate. For example, in some embodiments, the software may be configured to reprogram the enhanced PCIe endpoint card in response to a request from a subscriber for a change in a virtualized computing system that is provided for their use, or in response to a request for resource instances for a virtualized computing system for the use of a different service subscriber. In various embodiments, in addition (or instead of) using software to change the number or type of PCIe compliant hardware devices and physical/virtual functions thereof that can be emulated by the endpoint card (e.g., by loading emulation code for more, fewer, or different hardware devices and physical/virtual functions into the memory on the endpoint card), software may be used to reconfigure the hardware of the enhanced PCIe endpoint card, such as by instantiating more transaction ring buffers or deallocting one or more transaction ring buffers, or by writing to various CSRs and/or pointer registers for one or more of the ring buffers.

As previously noted, in some embodiments, a PCI switch may be integrated on the enhanced PCIe endpoint card to allow the endpoint card to be able to support more physical functions. The PCI switch may be a physical PCI switch (e.g., one implemented by circuitry on the endpoint card), or a virtual PCI switch (e.g., a switch emulated by software executing on the endpoint card), in different embodiments. In either case, it may appear to the rest of the system (e.g., to software executing in the system) as a PCI switch.

In embodiments in which a PCI switch is integrated on the enhanced PCIe endpoint card, the PCI switch may support the PCI hot-plug feature, allowing physical and/or virtual functions to be easily and dynamically introduced and/or removed. For example, in some embodiments, it may be desirable to be able to dynamically reconfigure the system, e.g., to add more virtual block devices, to reduce the number of virtual block devices, to increase the number of virtual network adapters, etc. In some embodiments that include an integrated PCI switch, when an emulated hardware device is brought up on the endpoint card, the host may see this as a hot-plug event, and may be configured to recognize and interact with that emulated hardware device in the same manner as it would if an equivalent hardware device were dynamically introduced into the system. By contrast, in systems that rely solely on SR-IOV as a way of virtualizing devices, there is not a flexible or robust mechanism for dynamically adding and/or removing virtual functions.

As previously noted, in some embodiments, an enhanced PCIe endpoint device (such as those described herein) may be configured (e.g., by writing appropriate emulation code into a memory on the device) to emulate a PCIe card that is functioning as a USB controller. In some such embodiments, the enhanced PCIe endpoint device may be locally attached to a host server (e.g., it may be plugged into a PCIe expansion slot on the host server) and may present the emulated USB controller as a locally-attached device to the host server. For example, it may provide local USB ports to the host server from the PCIe expansion slot. However, the communication traffic coming into the emulated USB controller from a USB device (e.g., a client-side peripheral device) may actually be remote network traffic that is received via a USB redirection mechanism, rather than local traffic.

As described in more detail below, the enhanced PCIe endpoint device may, in different embodiments, be configured to emulate peripheral bus/interface controllers other than a USB controller, or multiple different peripheral bus/interface controllers by writing more or different emulation code into the memory on the endpoint device. In such embodiments, the enhanced PCIe endpoint device may present other emulated peripheral bus/interface controllers as locally-attached devices to the host server (and/or to physical or virtualized computing resource instances thereof), and (e.g., through a bus/interface redirection mechanism similar to the USB redirection mechanism) provide access to the functionality of a variety of client-side peripheral devices that are compliant with the protocols implement by those emulated peripheral bus/interface controllers. In various embodiments, the techniques for presenting client-side physical devices to physical or virtual computers on a host server through bus/interface redirection and emulation of bus/interface controllers on an enhanced PCIe endpoint may be used to allow access to the functionality of the client-side physical devices from with a virtual desktop instance executing on the host server (or from an application running on a virtual desktop instance, a provisioned virtual computing resource instance, or a provisioned physical computing resource instance, in different embodiments).

As described in more detail below, a bus/interface redirection module (e.g., a software USB redirection module) may execute on the client device to which a physical client-side peripheral device is locally attached. The communication traffic generated by the physical client-side peripheral device may be transformed (e.g., by the bus/interface redirection module) into IP packets that are suitable for transport to an emulated bus/interface controller on an enhanced PCIe endpoint over a network (e.g., the public Internet or an intermediate network). These IP packets may be transported to the network side of the enhanced PCIe endpoint, e.g., to a network interface on the enhanced PCIe endpoint other than the interface over which the enhanced PCIe endpoint communicates with the host server (e.g., through a PCIe controller on the enhanced PCIe endpoint).

In some embodiments, e.g., in embodiments in which the host server provides a virtual desktop instance on behalf of (and for the use of) the client, another software module (e.g., a client portion of an application that implements the virtual desktop instance) may be executing on the client device. In some such embodiments, the bus/interface redirection module (e.g., a software USB redirection module) may be a sub-module of the client-side virtual desktop module. In other embodiments, two or more separate software modules may collectively perform the functions of the client-side virtual desktop module and the bus/interface redirection module.

Figure 5:
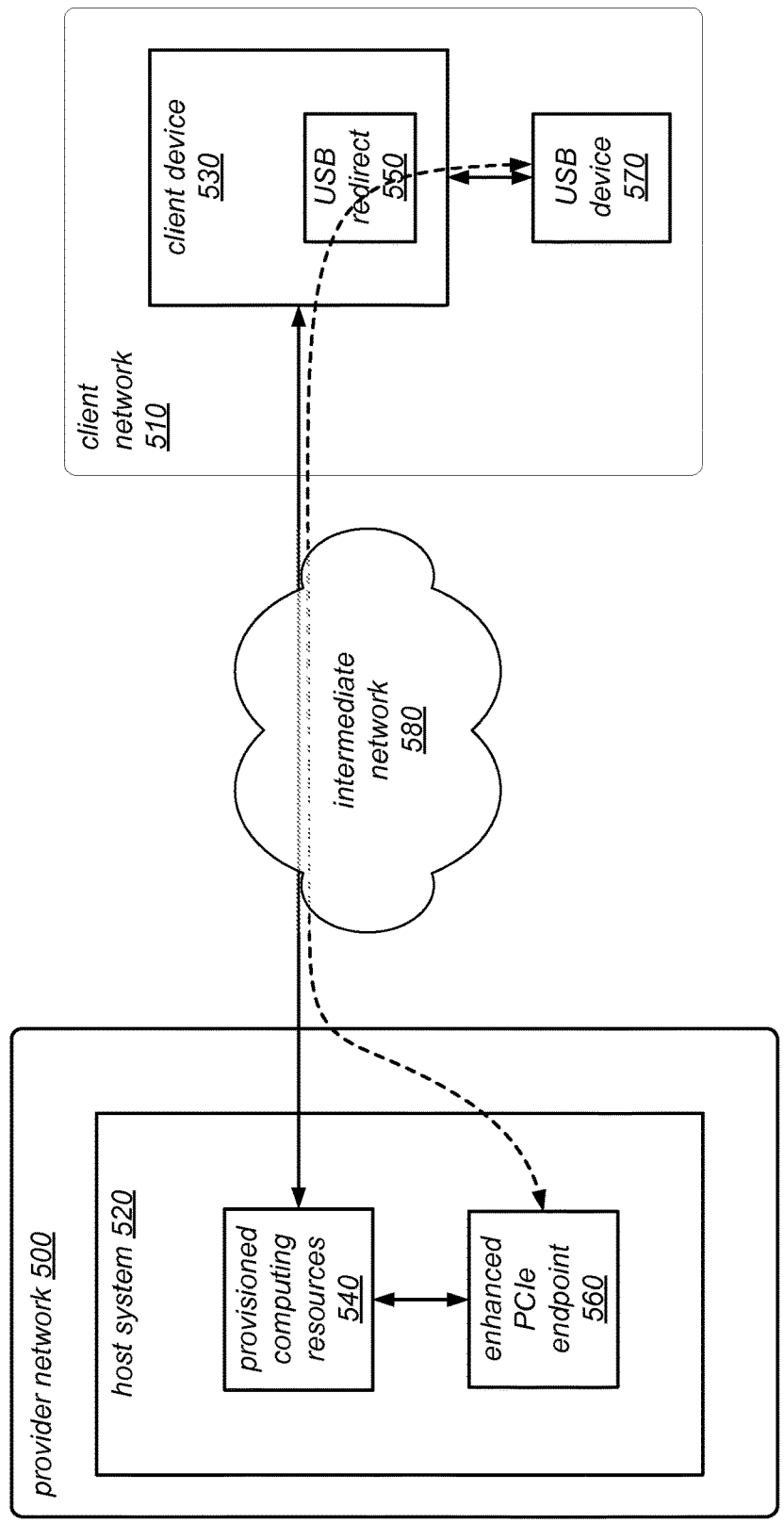
FIG. 5 is a block diagram illustrating the use of USB redirection in presenting a physical USB device to provisioned host computing resources through the emulation of a USB controller on an enhanced PCIe endpoint, according to at least one embodiment.

FIG. 5 is a block diagram illustrating the use of USB redirection in presenting a physical USB device to provisioned computing resources in a host computing system (e.g., a virtual compute instance or physical computing resources that are provisioned for the use of a client) through the emulation of a USB controller on an enhanced PCIe endpoint, according to at least one embodiment. As illustrated in this example, a provider network 500 may include a host system 520 on which computing resources 540 (e.g., a virtual compute instance or physical computing resources) have been provisioned for the use of a client. The host system 520 may also include an enhanced PCIe endpoint 560. In some embodiments, enhanced PCIe endpoint 560 may be similar to enhanced PCIe endpoint 420 illustrated in FIG. 4, and may be configured to accelerate the emulation of PCIe compliant hardware devices and/or to present client-side physical devices to virtual computers (or virtual compute instances) using bus redirection and software emulation of bus controllers on the PCIe endpoint device.

As illustrated in this example, a client network 510 may include a client device 530, on which a USB redirection module 550 is executing, and a physical USB device 570 that is connected (locally attached) to the client device 530.

In some embodiments, provisioned computing resources 540 may include a virtual compute instance that is provided for the use of client device 530, and may be configured to implement a virtual desktop on the client's behalf (e.g., for access by a user or service subscriber). In other embodiments, provisioned computing resources 540 may include physical computing resources (e.g., a host machine) that is provided for the use of client device 530. The solid line connecting client device 530 and provisioned computing resources 540 through intermediate network 580 represents a path over which commands and/or data are exchanged between these components through any suitable network interface(s) or using any of a variety of software virtualization techniques (which may include a thin client module executing on client device 530, not shown). In this example, the dotted line connecting USB device 570 and enhanced PCIe endpoint 560 (through USB redirection module 550 and over intermediate network 580) represents an alternate path between components of the host system 520 and client network 510 using USB redirection (e.g., a more direct path, rather than a path that relies on software virtualization techniques or a connection to the provisioned computing resources 540). In this example, USB communication traffic that is passed from USB device 570 to a network interface of enhanced PCIe endpoint 560 may be processed or otherwise handled by an emulated USB controller executing on enhanced PCIe endpoint 560, which may then pass commands and/or data included in that USB communication traffic to provisioned computing resources 540 (via a PCIe controller of enhanced PCIe endpoint 560).

As illustrated in FIG. 5, in some embodiments, a USB redirection module may execute on a client device and may be configured to redirect communication traffic from a locally-attached physical USB device to another device over a network (e.g., an enhanced PCIe endpoint, in this example). In some embodiments, this USB redirection module may implement a standard USB redirection protocol for tunneling USB traffic to a single USB device. In some cases, the protocol may assume the existence of a reliable bidirectional transport, such as a TCP socket. The protocol may define the "USB-device" as the device whose USB transfers are being tunneled, the "USB-host" as the entity (such as the client device to which the "USB-device" is physically connected) that implements the USB redirection module that makes the "USB-device" available to the "USB-guest", and the "USB-guest" as the entity (such as the enhanced PCIe endpoint, in this example) on another machine to which the "USB-device" is connected over the network.

According to the USB redirection protocol, each packet (e.g., each control packet and/or data packet) exchanged between the "USB-guest" and the "USB-host" may include a redirection header, an optional packet-type-specific header, and optional additional data. Control packets may be handled synchronously inside the "USB-host", while the "USB-host" may wait for acknowledgment of a response from "USB-device" after sending a data packet. Control packets may include packets for connecting and disconnecting the "USB-device" to the "USB-guest", configuration packets, and other types of control packets, in various embodiments. Data packets may be received in bulk streams (with or without buffering), in some embodiments.

Figure 6:
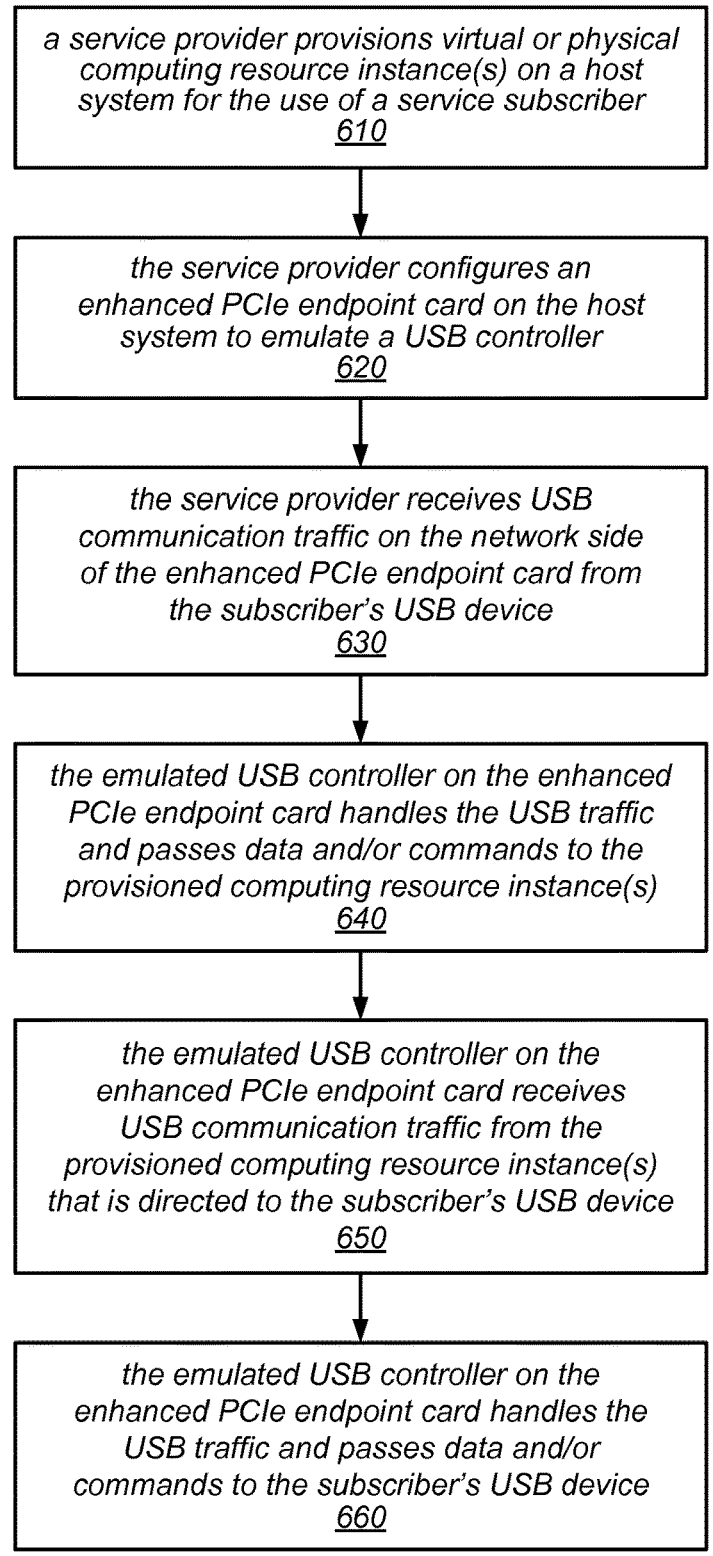
FIG. 6 is a flow diagram illustrating one embodiment of a method for handling USB communication traffic in a service provider network using USB redirection and emulation of a USB controller on an enhanced PCIe endpoint.

One embodiment of a method for handling USB communication traffic in a service provider network using USB redirection and the emulation of a USB controller on an enhanced PCIe endpoint is illustrated by the flow diagram in FIG. 6. In this example, the method is presented from the perspective of a service provider system that includes an enhanced PCIe endpoint card and that provides computing services to clients (e.g., customers and/or service subscribers). As illustrated at 610, in this example, the method may include a service provider provisioning one or more virtual and/or physical computing resource instances on a host system for the use of a service subscriber. The method may also include the service provider configuring an enhanced PCIe endpoint card on the host system to emulate a USB controller (as in 620).

As illustrated in FIG. 6, the method may include the service provider receiving USB communication traffic on the network side of the enhanced PCIe endpoint card from a physical USB device in a client computing system through which the subscriber receives computing services, as in 630. For example, in some embodiments, the enhanced PCIe endpoint card may include a network interface (one that that is separate from the PCIe controller through which it communicates with the host system) through which it communicates with other networks (e.g., the public Internet or an intermediate network) and/or other networked devices in the service provider's data center (e.g., to the next level data center routers that, eventually, connect together all of the other servers, or racks thereof, in the data center). The method also include the emulated USB controller on the enhanced PCIe endpoint card processing or otherwise handling the USB traffic and passing data and/or commands that are included in the received traffic to the provisioned computing resource instance(s), as in 640.

As illustrated in FIG. 6, the method may include the emulated USB controller on the enhanced PCIe endpoint card receiving USB communication traffic from the provisioned computing resource instance(s) that is directed to the subscriber's USB device, as in 650. For example, an application executing on a virtual computing resource instance on the host system may access the functionality of the subscriber's physical USB device by communicating USB compliant commands and/or data to the emulated USB controller on the enhanced PCIe endpoint card through the PCIe controller on the enhanced PCIe endpoint card. In another example, an application executing on a physical computing resource instance (e.g., a processor or SOC) on the host system may access the functionality of the subscriber's physical USB device by communicating USB compliant commands and/or data to the emulated USB controller on the enhanced PCIe endpoint card through the PCIe controller on the enhanced PCIe endpoint card. The method may also include the emulated USB controller on the enhanced PCIe endpoint card handling or otherwise processing the USB communication traffic and passing data and/or commands that are included in the received traffic to the subscriber's USB device, as in 660.

In some embodiments, the apparatus and techniques described herein for presenting client-side physical devices to virtual or physical computers on a host system through bus/interface redirection and emulation of bus/interface controllers on an enhanced PCIe endpoint may allow the functionality of a physical client-side security device (e.g., a USB token) to be accessed by a physical (e.g., bare metal) computing resource of the host system that have been provisioned for the use of a client, a virtualized computing resource instance or by an application executing on a physical or virtualized computing resource instance or a virtual desktop instance. For example, a user of a client computing device to which a USB security card reader device is locally attached may insert a security badge or access card into the card reader device as part of a multi-factor authorization mechanism. The card reader may provide the data read from the security badge or access card to an emulated USB controller on an enhanced PCIe endpoint using USB redirection. The enhanced PCIe endpoint may pass the data from the emulated USB controller (which is presented as a locally-attached device on the host server) to provisioned computing resources on the host system (e.g., resources that implement a virtual desktop instance, in some cases) through a PCIe controller so that a security application executing on the provisioned computing resources can authenticate and/or determine the access permissions of the user.

In other embodiments, the apparatus and techniques described herein for presenting client-side physical devices to provisioned physical and/or virtual computers on a host system through bus/interface redirection and emulation of bus/interface controllers on an enhanced PCIe endpoint may allow the functionality of a physical client-side input/output devices (e.g., web cameras or other image capture devices, audio/music player devices, printers, etc.) or storage devices (e.g., USB storage devices) to be accessible to physical and/or virtualized computing resource instances on a host system or by an application executing on a provisioned computing resource instance or virtual desktop instance on the host system. Unlike with existing software virtualization techniques, the physical enhanced PCIe endpoint device that is locally attached to the host system makes it appear as if a physical bus/interface controller for a client-side device is locally attached to the host system (e.g., through a port of a PCIe slot).

Figure 7:
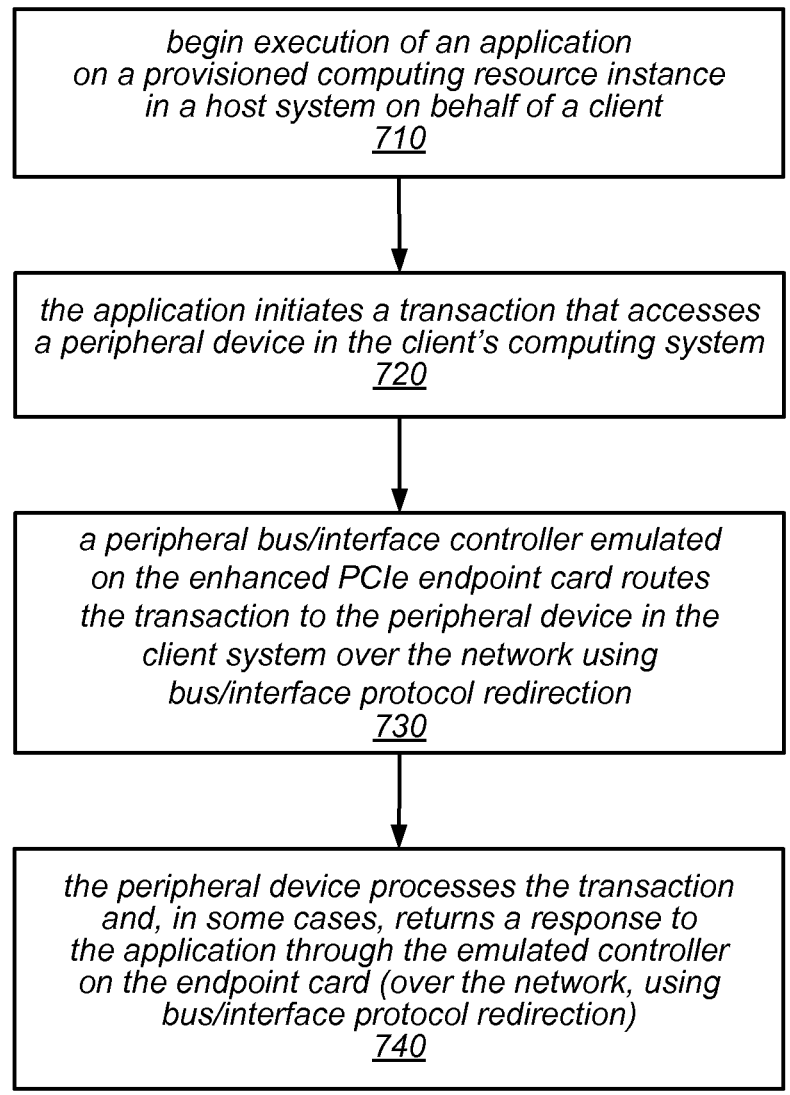
FIG. 7 is a flow diagram illustrating one embodiment of a method for an application executing on a provisioned computing resource to access the functionality of a client's physical peripheral device.

One embodiment of a method for an application executing on a provisioned virtual or physical computing resource in a host system to access the functionality of a client's physical peripheral device is illustrated by the flow diagram in FIG. 7. In this example, the method is presented from the perspective of an application that is executing on provisioned physical or virtualized computing resources in a host system and that accesses a physical peripheral devices in a client computing system. As illustrated at 710, in this example, the method may include beginning execution of an application on a provisioned computing resource instance in a host system on behalf of a client. The method may include the application initiating a transaction that accesses a peripheral device in the client's computing system (as in 720).

In response to the transaction, the method may include a peripheral bus/interface controller that is emulated on the enhanced PCIe endpoint card routing the transaction to the peripheral device in the client system over a network (e.g., the public Internet or another intermediate network) using bus/interface protocol redirection (as in 730). The method may also include the peripheral device processing the transaction and, in some cases, returning a response to the application through the emulated controller on the endpoint card (e.g., over the network, using the bus/interface protocol redirection), as in 740.

As previously noted, in some embodiments, the apparatus and techniques described herein may allow a client-side physical peripheral device to be accessible from within a virtual desktop. One embodiment of a method for a client to access a local physical peripheral device from a virtual desktop session executing on a remote system is illustrated by the flow diagram in FIG. 8. As illustrated at 810, in this example, the method may include a client requesting virtual desktop services, and specifying virtual computing and/or storage resources for use in subsequent virtual desktop sessions. The method may also include the client specifying a bus/interface protocol to be used for attaching one or more client peripheral devices to virtual computing resources, as in 820. In response to being granted the requested resources, the method may include the client connecting to the service, which may include invoking a client-side virtual desktop module and a client-side bus/interface protocol redirection module that is configured to route peripheral device traffic over a network to a hardware device (in the service provider system) that emulates a controller for the specified bus/interface protocol, as in 830.

Figure 8:
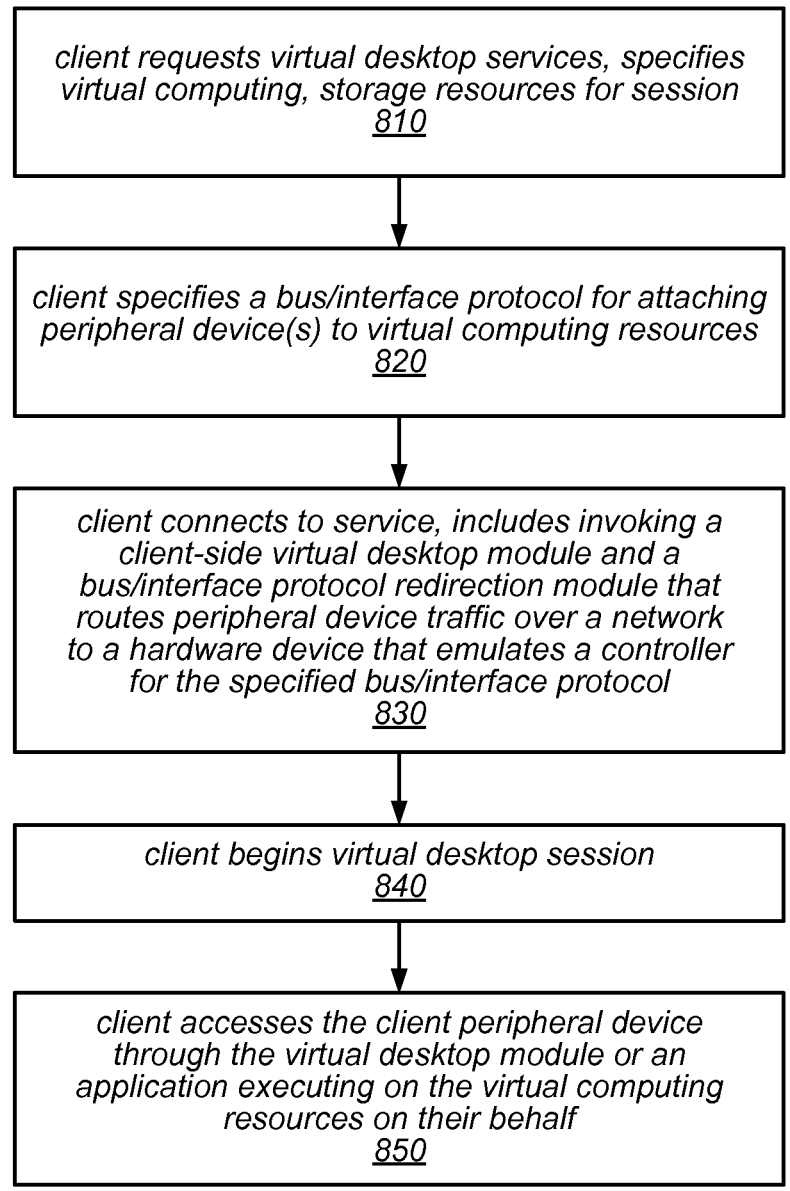
FIG. 8 is a flow diagram illustrating one embodiment of a method for a client to access a local physical peripheral device from a virtual desktop session executing on a remote system.

As illustrated in FIG. 8, the method may include the client beginning a virtual desktop session (as in 840), and, during the session, the client accessing the client peripheral device through the virtual desktop module or through an application executing on the virtual computing resources on the client's behalf (as in 850). For example, in various embodiments, the client or application may invoke a function of a client-side input/output device (e.g., a web camera or other image capture device, audio/music player device, or printer), storage device, or security device that appears as if is it attached locally to the virtual computing resources.

Note that while several embodiments of apparatus and techniques for presenting physical devices to virtualized computing resources through bus-interface redirection and the software emulation of hardware bus/interface controllers on an enhanced PCIe endpoint device are described herein in terms of client-side USB devices and software emulated USB controllers, in other embodiments, these apparatus and techniques may be applied to present physical devices that comply with other bus/interface protocols to virtualized computing resources. For example, a client device may implement a redirection mechanism for a storage interface or a display interface, and the enhanced PCIe endpoint device may be configured to emulate a corresponding storage device interface controller, or display interface controller. Similarly, while these techniques are described herein in terms of several specific example peripheral devices, it should be understood that they may be applied to other types of peripheral devices that may be locally attached to a client device to allow the functionality of these other types of peripheral devices to be accessible to a virtualized computing resource instance or an application executing on a virtualized computing resource instance or virtual desktop instance on a host server of a system that provide virtual computing and/or storage services to clients.

Figure 9:
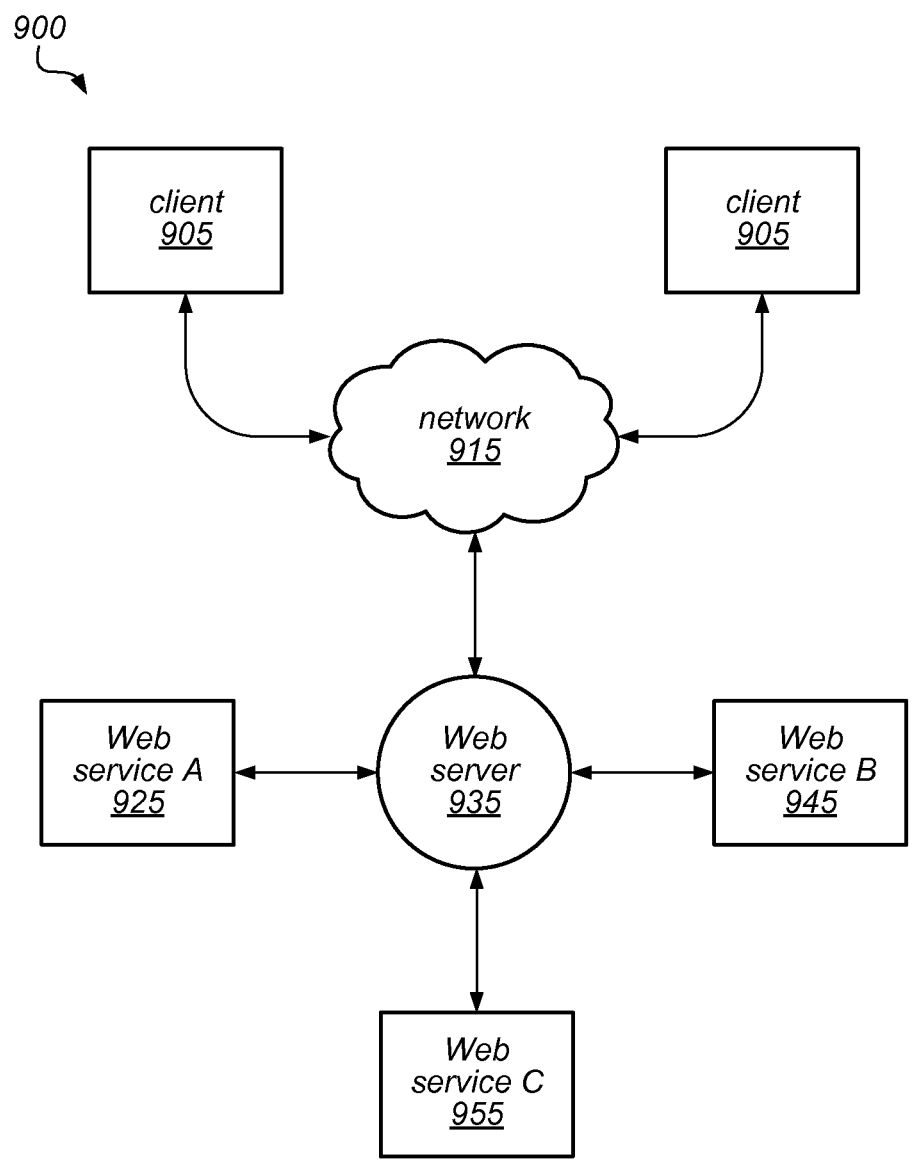
FIG. 9 is a block diagram illustrating one embodiment of a system that provides various Web-based services to clients.

Various techniques described herein for using an enhanced PCIe endpoint to accelerate the emulation of PCIe compliant hardware devices and/or to present client-side physical devices to virtual computers (or virtual compute instances) using bus redirection and software emulation of bus controllers on the PCIe endpoint device may be employed in local or remote computing systems, including systems that provide services to users (e.g., subscribers) over the Internet or over other public or private networks, such as virtual private networks and connections to services in a virtual private cloud (VPC) environment. FIG. 9 illustrates a block diagram of a system that provides various Web-based services to clients, according to one embodiment. In this example, system 900 includes one or more clients 905. In this example, the clients 905 may be configured to interact with a Web server 935 via a communication network 915.

As illustrated in this example, the Web server 935 may be configured to process requests from clients 905 for various services, such as Web service A (925), Web service B (945), and Web service C (955), and to return results to the clients 905. Each of the web services may provide clients with one or more of: computational resources, database services, data storage services (e.g., maintaining data in one or more tables on behalf of a client), or any other types of services or shared resources.

Figure 10:
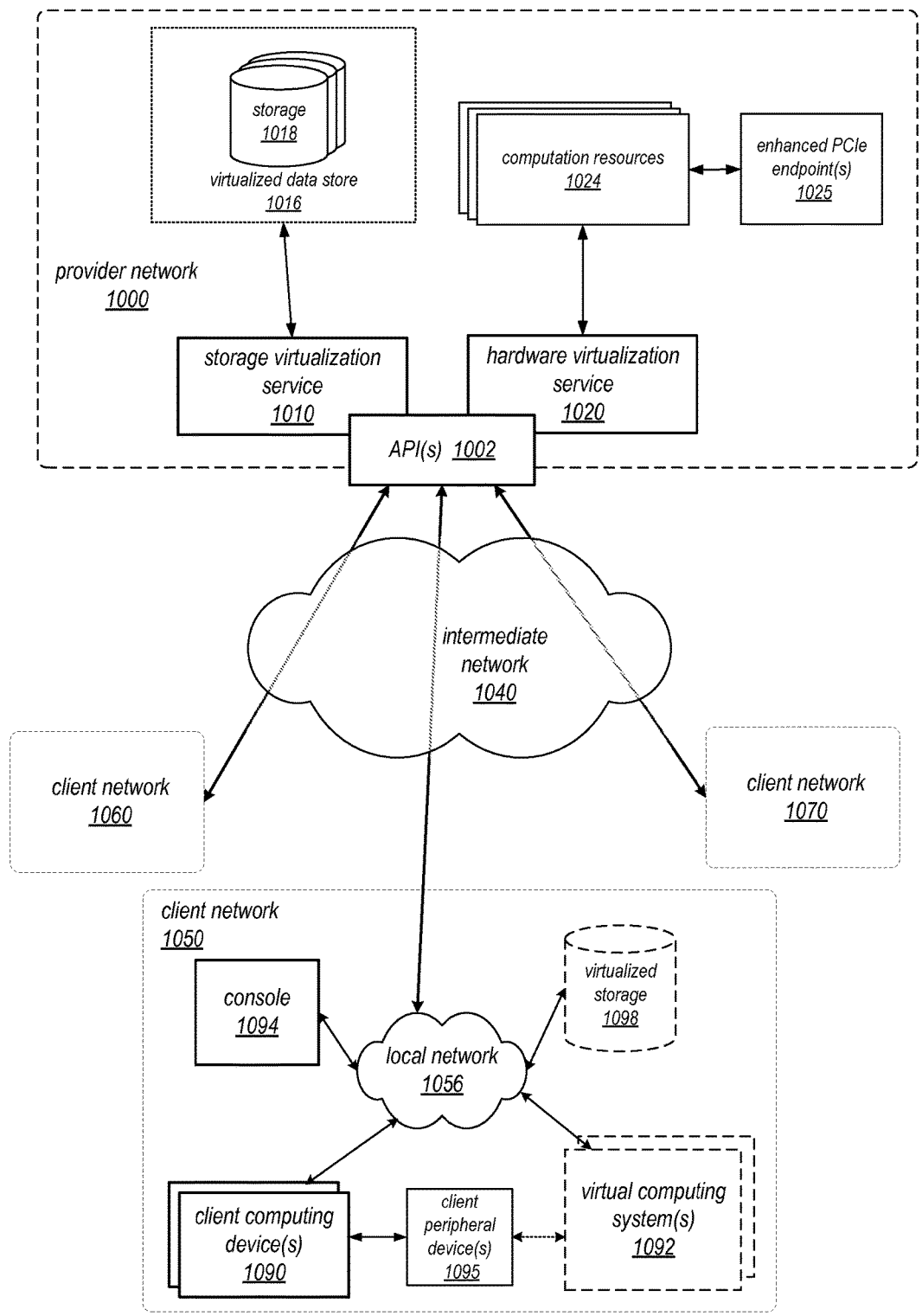
FIG. 10 is a block diagram illustrating an example provider network environment in which the apparatus and techniques described herein are used to present client-side physical devices to physical or virtual computers in a host system using bus redirection and software emulation of bus controllers on PCIe endpoint devices, according to at least some embodiments.

FIG. 10 is a block diagram illustrating an example provider network environment in which the techniques described herein for using an enhanced PCIe endpoint to accelerate the emulation of PCIe compliant hardware devices and/or to present client-side physical devices to virtual computers (or virtual compute instances) using bus redirection and software emulation of bus controllers on the PCIe endpoint device may be employed, according to at least some embodiments. In this example, the provider network environment 1000 provides a storage virtualization service and a hardware virtualization service to clients. In this example, hardware virtualization service 1020 provides multiple computation resources 1024 (e.g., host processors executing one or more VMs) to clients. The computation resources 1024 may, for example, be rented or leased to clients of the provider network 1000 (e.g., to a client that implements client network 1050, client network 1060, and/or client network 1070) in order to implement various applications. Each computation resource 1024 may be provided with one or more private IP addresses. Provider network 1000 may be configured to route packets from the private IP addresses of the computation resources 1024 to public Internet destinations, and from public Internet sources to the computation resources 1024. As illustrated in this example, in some embodiments, the service provider network may also include one or more enhanced PCIe endpoints 1025 (which may be similar to enhanced PCIe endpoint 420 illustrated in FIG. 4), e.g., one or more PCIe cards that are configured to emulate physical and/or virtual functions of PCIe compliant devices for the benefit of service subscribers and/or to emulate USB or other peripheral bus controllers and to present client-side peripheral devices to virtual computing resource instances as if they were locally attached.

Provider network 1000 may provide a client network (e.g., client network 1050, 1060, or 1070 coupled to intermediate network 1040 via local network 1056) the ability to implement virtual computing systems 1092 via hardware virtualization service 1020 coupled to intermediate network 1040 and to provider network 1000. Note that, in some embodiments, the virtual computing systems 1092 implemented on behalf of service subscribers may include virtual PCIe compliant devices, which are emulated on the enhanced PCIe endpoint card(s) 1025. As illustrated by the solid line connecting elements 1095 and 1090, in this example, one or more client peripheral devices 1095 may be locally attached to a client computing device 1090 within client network 1050. As illustrated by the dashed line connecting elements 1095 and 1092, in this example, these client peripheral devices 1095 may be presented to virtual computing systems 1092 as if they were locally-attached peripheral devices through bus redirection and the emulation of appropriate bus controller(s) on enhanced PCIe endpoint card(s) 1025, as described herein.

Note that in some embodiments, each of client networks 1060 and 1070 may include elements that are similar to corresponding elements of client network 1050 (not shown) and may provide functionality similar to that of client network 1050, while in other embodiments, client network 1060 and/or 1070 may include more, fewer, or different elements than those illustrated in FIG. 10 as being part of client network 1050 and/or may provide functionality that is different from that of client network 1050. In some embodiments, hardware virtualization service 1020 may provide one or more APIs 1002, for example a web services interface, via which a client network 1050, 1060, or 1070 may access functionality provided by the hardware virtualization service 1020 via a console such as console 1094. In at least some embodiments, at the provider network 1000, each virtual computing system at a client network (e.g., a virtual computing system 1092 at client network 1050) may correspond to computation resources 1024 and/or enhanced PCIe endpoints 1025 that are leased, rented, or otherwise provided to the client network.

In this example, from an instance of a virtual computing system 1092 and/or another client device 1090 or console 1094 of a client network 1050, 1060, or 1070, a client may access the functionality of storage virtualization service 1010, for example via one or more APIs 1002, to access data from and store data to a virtual data store 1016 provided by the provider network 1000. In some embodiments, a virtualized data store gateway (not shown) may be provided at the client network (e.g., at client network 1050, 1060, or 1070) that may locally cache at least some data, for example frequently accessed or critical data, and that may communicate with storage virtualization service 1010 via one or more communications channels to upload new or modified data from a local cache so that the primary store of data (virtualized data store 1016) is maintained. In at least some embodiments, a user, via a virtual computing system 1092 and/or on another client device 1090, may mount and access one or more storage volumes 1018 of virtual data store 1016, each of which appears to the user as local virtualized storage 1098.

The methods described herein may in various embodiments be implemented by any combination of hardware and/or software. For example, in one embodiment, the methods may be implemented by one or more computer systems, each of which includes a processor executing program instructions stored on a computer-readable storage medium coupled to the processor. The program instructions may be configured to implement at least some of the functionality described herein for using an enhanced PCIe endpoint to accelerate the emulation of PCIe compliant hardware devices and/or to present client-side physical devices to virtual computers (or virtual compute instances) using bus redirection and software emulation of bus controllers on the PCIe endpoint device. Note that while several examples included herein describe using an enhanced PCIe endpoint to accelerate the emulation of PCIe compliant hardware devices and/or to present client-side physical devices to virtual computers (or virtual compute instances) provided by a host system (which may be a host system of a service provider) using bus redirection and software emulation of bus controllers on the PCIe endpoint device, in other embodiments, these techniques may also be applied in systems in which the host system provides physical computing and/or storage resources (rather than, or in addition to, virtualized computing resource instances). For example, in some embodiments, physical computing resources (e.g., physical computers) in a host system may be provisioned for the use of a client, and that host system may include an enhanced PCIe endpoint device (such as those described herein). In such embodiments, the enhanced PCIe endpoint device may be used to accelerate the emulation of PCIe compliant hardware devices and/or to present client-side physical devices to the provisioned physical computing resources using bus redirection and software emulation of bus controllers on the PCIe endpoint device.

Figure 11:
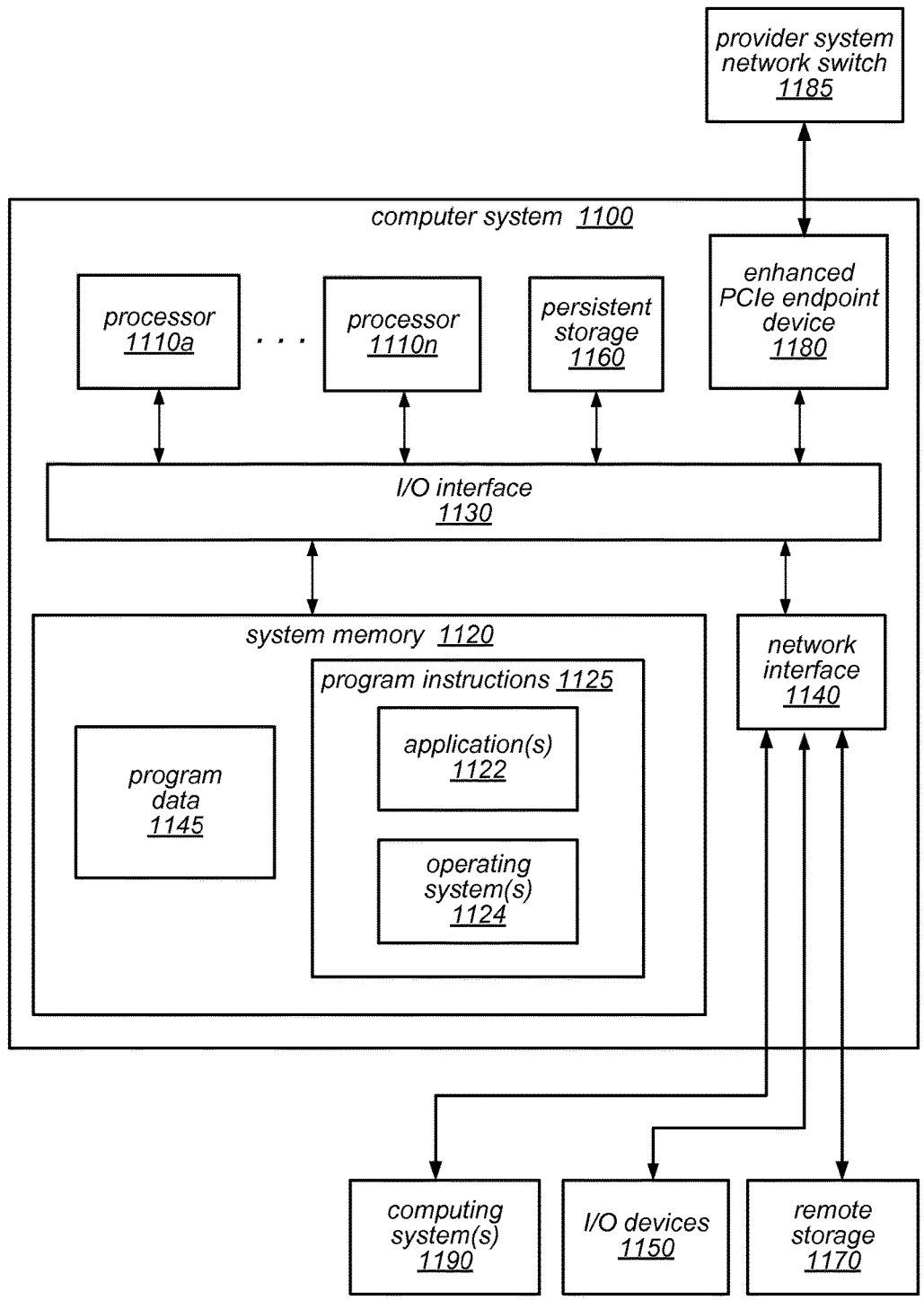
FIG. 11 is a block diagram illustrating a computer system configured to implement the techniques described herein, according to various embodiments.

FIG. 11 is a block diagram illustrating a computer system configured to implement at least a portion of the techniques described herein, according to various embodiments. Computer system 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. Note that computer system 1100 may, in various embodiments, be a stand-alone system that provides shared memory for multiple concurrently executing processes and/or applications, a single one of multiple identical or similar computing nodes in a distributed system, or a single computing node in a provider network that provides storage and/or computing services to clients, as described herein. In some embodiments, computer system 1100 may be an enhanced PCIe endpoint device on which any number of PCIe compliant hardware devices are emulated on behalf of computing service clients, customers, or subscribers.

Computer system 1100 includes one or more processors 1110 (any of which may include multiple cores, which may be single or multi-threaded) coupled to a system memory 1120 via an input/output (I/O) interface 1130. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose, special-purpose, or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. The computer system 1100 also includes one or more network communication devices (e.g., network interface 1140) for communicating with other systems and/or components over a communications network (e.g. Internet, LAN, etc.). For example, a client application executing on system 1100 may use network interface 1140 to communicate with a server application executing on a single server or on a cluster of servers that implement a distributed system. In another example, an instance of a server application executing on computer system 1100 may use network interface 1140 to communicate with a client application and/or with other instances of the server application that may be implemented on other computer systems.

In the illustrated embodiment, computer system 1100 includes one or more persistent storage devices 1160. In various embodiments, persistent storage devices 1160 may correspond to disk drives, tape drives, solid state memory, other mass storage devices, or any other persistent storage device. Computer system 1100 (or an application, software component, or operating system operating thereon) may store instructions and/or data in persistent storage devices 1160, as desired, and may retrieve the stored instruction and/or data as needed. Computer system 1100 also includes enhanced PCIe endpoint device 1180, which may be similar to enhanced PCIe endpoint 420 illustrated in FIG. 4. For example, enhanced PCIe endpoint device 1180 may include an endpoint SOC (such as endpoint SOC 480 in FIG. 4), which includes a network interface, a PCIe endpoint controller, an emulation processor, host interface circuitry (such as host interface module 460), a request processor, host interface steering logic, a response processor, multiple transaction ring buffer CSRs and transaction ring buffer pointers, endpoint memory (such as endpoint memory 470), which may store emulation code and/or include (instantiated within memory 470) multiple transaction ring buffers, and/or any other circuitry suitable to support using an enhanced PCIe endpoint to accelerate the emulation of PCIe compliant hardware devices and/or to present client-side physical devices to provisioned physical or virtual computers (or virtual compute instances) of a host system using bus redirection and software emulation of bus controllers on the PCIe endpoint device, as described herein.

As illustrated in FIG. 11, a network interface of enhanced PCIe endpoint device 1180 may communicate with other networks and/or networked devices through provider system network switch 1185. For example, in some embodiments, provider system network switch 1185 may serve to connect the enhanced PCIe endpoint device 1180 (or a network interface thereof) to other networks (e.g., to the public Internet or to an intermediate network) and/or to other networked devices in a provider's data center (e.g., to the next level data center routers that, eventually, connect together all of the other servers, or racks thereof, in the data center). In some embodiments, communication traffic that is received by enhanced PCIe endpoint device 1180 over a network from a peripheral device (e.g., a USB device) in a client system using a bus redirection mechanism (e.g., USB redirection) may be received through provider system network switch 1185.

Computer system 1100 includes one or more system memories 1120 that are configured to store instructions and data accessible by processor 1110. In various embodiments, system memories 1120 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1120 may contain program instructions 1125 that are executable by processor(s) 1110 to implement at least a portion of the methods and techniques described herein for using an enhanced PCIe endpoint to accelerate the emulation of PCIe compliant hardware devices and/or to present client-side physical devices to provisioned physical or virtual computers (or virtual compute instances) of a host system using bus redirection and software emulation of bus controllers on the PCIe endpoint device (e.g., functions that are executed on a host system or a host server of a provider network). In various embodiments, program instructions 1125 (and/or program instructions within any emulation code stored in memory on enhanced PCIe endpoint device 1180) may be encoded in platform native binary, any interpreted language such as Java™ byte-code, or in any other language such as C/C++, Java™, etc., or in any combination thereof. For example, in the illustrated embodiment, program instructions 1125 include program instructions executable to implement one or more application(s) 1122 (which may include various configuration modules, not shown), and/or operating system(s) 1124, which may include or be implemented as a hypervisor or virtual machine monitor, or any of various operating systems, such as UNIX, LINUX, Solaris™, MacOS™, Windows™, etc.

Note that in various embodiments, some or all of system memory 1110 (including some or all of program instructions 1125 and/or program data 1145) may be implemented within shared physical memory pages in a stand-alone computing system or in a system that provides physical or virtualized resources to clients, as described herein.

Any or all of program instructions 1125, including application(s) 1122, configuration module(s), emulation code stored in memory on enhanced PCIe endpoint device 1180, and/or operating system(s) 1124, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1140.

In some embodiments, system memory 1120 may include storage for program data 1145. In various embodiments, system memory 1120 (e.g., program data 1145 within system memory 1120) and/or remote storage 1170 may store various configuration parameter values or other information usable in implementing the methods and techniques described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In various embodiments, I/O interface 1130 may include support for devices attached through one or more types of peripheral buses, such as a variant of the Peripheral Component Interconnect (PCI) bus standard, the Peripheral Component Interconnect Express (PCIe) bus standard, or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems 1190 (which may implement one or more server nodes and/or clients of a distributed system, such as a host server or host processor thereof), for example. In addition, network interface 1140 may be configured to allow communication between computer system 1100 and various I/O devices 1150 and/or remote storage 1170. Input/output devices 1150 may, in some embodiments, include one or more display terminals, keyboards, keypads, touchpads, scanning devices, voice or optical recognition devices, or any other devices suitable for entering or retrieving data by one or more computer systems 1100. Multiple input/output devices 1150 may be present in computer system 1100 or may be distributed on various nodes of a distributed system that includes computer system 1100. In some embodiments, similar input/output devices may be separate from computer system 1100 and may interact with one or more nodes of a distributed system that includes computer system 1100 through a wired or wireless connection, such as over network interface 1140. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol. In various embodiments, computer system 1100 may include more, fewer, or different components than those illustrated in FIG. 11 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. An apparatus, comprising:
   a local emulation processor;
   a Peripheral Component Interconnect Express (PCIe) controller;
   a network interface; and
   a memory, comprising program instructions that when executed by the local emulation processor emulate a hardware Universal Serial Bus (USB) host controller that is compliant with a PCIe standard;
   wherein the apparatus is coupled, through the PCIe controller, to a host computing node on which a virtualized computing resource instance implements a virtual desktop instance on behalf of a client;
   wherein the network interface is configured to receive USB communication traffic from a physical USB device of a remote computing system on which the client interacts with the virtual desktop instance, wherein the remote computing system on which the client interacts with the virtual desktop instance is remote from the host computing node and from the apparatus;
   wherein, in response to receipt of the USB communication traffic, the apparatus is configured to:
   present the emulated hardware USB controller to the virtualized computing resource instance as a locally-attached USB device; and
   pass data or commands that are included in the USB communication traffic from the physical USB device of the remote computing system, through the PCIe controller, to an application executing on the virtual desktop instance so that the data or commands appear to come from the locally-attached USB device.

2. The apparatus of claim 1,
   wherein the emulated hardware USB controller is configured to receive from the application, through the PCIe controller, USB communication traffic that is directed to the physical USB device; and
   wherein in response to receipt of the USB communication traffic that is directed to the physical USB device, the apparatus is configured to pass, through the network interface to the physical USB device, data or commands that are included in the USB communication traffic that is directed to the physical USB device.

3. The apparatus of claim 1, wherein the network interface is configured to receive the USB communication traffic from the physical USB device of the remote computing system on which the client interacts with the virtual desktop instance via a USB redirection mechanism implemented on the remote computing system on which the client interacts with the virtual desktop instance.

4. The apparatus of claim 1, wherein the USB communication traffic comprises data or commands received from a physical USB security token for use in an authorization operation performed on the virtualized computing resource instance.

5. The apparatus of claim 1,
   wherein, when executed by the emulation processor, the program instructions emulate two or more hardware devices that are compliant with the PCIe standard, and wherein the two or more emulated hardware devices comprise the emulated hardware USB controller;
   wherein the apparatus further comprises:
   one or more ring buffers, each configured to store information from a plurality of transaction layer packets that comprise transactions directed to the two or more emulated hardware devices; and
   packet steering circuitry;
   wherein, in response to receipt, from the host computing node, of a transaction layer packet comprising a transaction that is directed to one of the two or more emulated hardware devices, the packet steering circuitry is configured to steer information from the transaction layer packet to a particular one of the one or more ring buffers dependent, at least in part, on a routing identifier associated with a function of the one of the two or more emulated hardware devices; and
   wherein, subsequent to the information from the transaction layer packet being steered to the particular one of the one or more ring buffers, the processor is configured to retrieve the information from the transaction layer packet and process the transaction included in the information from the transaction layer packet, wherein to process the transaction, the processor is configured to execute a portion of the program instructions that when executed cause the processor to emulate the one of the two or more emulated hardware devices to which the transaction is directed.

6. A system, comprising:
one or more host computing nodes that collectively provide remote computing services to one or more clients, each of the host computing nodes comprising at least one processor and a memory;
an application executing on a computing resource instance that is hosted on one of the one or more host computing nodes on behalf of a client; and
an enhanced Peripheral Component Interconnect Express (PCIe) endpoint device;
wherein the enhanced PCIe endpoint device comprises:
an emulation processor;
a PCIe controller; and
a memory, comprising program instructions that when executed on the emulation processor emulate a hardware peripheral bus controller that is compliant with a PCIe standard;
wherein the application is configured to pass, through the PCIe controller to the emulated hardware peripheral bus controller on the enhanced PCIe endpoint device, data or commands that are directed to a physical peripheral device that is compliant with a protocol implemented by the emulated hardware peripheral bus controller and that is locally attached to a remote computing system through which the client receives remote computing services, wherein the remote computing system is remote from the one of the one or more host computing nodes;
wherein the enhanced PCIe endpoint device is coupled to the one of the one or more host computing nodes through the PCIe controller;
wherein the enhanced PCIe endpoint device is configured to present the emulated hardware peripheral bus controller to the computing resource instance as a locally-attached device and, in response to receipt of the data or commands, pass the data or commands to the physical peripheral device.

7. The system of claim 6,
wherein the enhanced PCIe endpoint device further comprises a network interface; and
wherein the enhanced PCIe endpoint device passes the data or commands to the physical peripheral device over a network through the network interface.

8. The system of claim 6,
wherein the enhanced PCIe endpoint device further comprises a network interface;
wherein the network interface of the enhanced PCIe endpoint device is configured to receive communication traffic from the physical peripheral device; and
wherein, in response to receipt of the communication traffic from the physical peripheral device:
the emulated hardware peripheral bus controller is configured to process the communication traffic received from the physical peripheral device; and
the enhanced PCIe endpoint device is configured to pass, through the PCIe controller to the application, data or commands included in the communication traffic received from the physical peripheral device.

9. The system of claim 8,
wherein the physical peripheral device is a Universal Serial Bus (USB) device; and
wherein the network interface is configured to receive the communication traffic from the physical peripheral device via a USB redirection mechanism executing on the computing system through which the client receives remote computing services.

10. The system of claim 6, wherein the physical peripheral device comprises a physical security token, a physical input/output device, or a physical storage device.

11. The system of claim 6, wherein the emulated hardware peripheral bus controller comprises an emulated Universal Serial Bus (USB) controller, an emulated storage device interface controller, or an emulated display interface controller.

12. The system of claim 6, wherein the computing resource instance comprises a physical computing resource instance.

13. The system of claim 6, wherein the computing resource instance comprises a virtualized computing resource instance.

14. The system of claim 13, wherein the virtualized computing resource instance implements a virtual desktop instance on behalf of the client, and wherein the client accesses virtual computing services through the virtual desktop instance.

15. A method, comprising:
receiving, by a network interface on a physical Peripheral Component Interconnect Express (PCIe) endpoint device that is connected to a host computing system, communication traffic from a physical device in a remote computing system of a client that is compliant with a bus interface protocol, wherein the remote computing system is remote from the host computing system;
processing, by an emulated bus controller on the physical PCIe endpoint device in response to receipt of the communication traffic, the communication traffic from the physical device, wherein the emulated bus controller emulates a bus controller for one or more devices that are compliant with the bus interface protocol; and
passing, by the emulated bus controller, data or commands that were included in the communication traffic to an application executing on a provisioned computing resource instance on the host computing system through a PCIe controller on the physical PCIe endpoint device, wherein the provisioned computing resource instance comprises a virtual computing resource instance or a physical computing resource instance.

16. The method of claim 15, wherein receiving the communication traffic comprises receiving the communication traffic via a bus interface redirection mechanism implemented on the computing system of the client.

17. The method of claim 15, wherein passing the data or commands comprises presenting the emulated bus controller to the host computing system as a locally-attached device.

* * * * *